(12) United States Patent
Yamakawa et al.

(10) Patent No.: US 9,979,344 B2
(45) Date of Patent: May 22, 2018

(54) CONTROLLER FOR ELECTRIC MOTOR SYSTEM

(71) Applicant: TOYOTA JIDOSHA KABUSHIKI KAISHA, Toyota-shi, Aichi-ken (JP)

(72) Inventors: Toshifumi Yamakawa, Shizuoka-ken (JP); Masaki Okamura, Toyota (JP); Naoyoshi Takamatsu, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/326,211

(22) PCT Filed: Jul. 13, 2015

(86) PCT No.: PCT/IB2015/001169
§ 371 (c)(1),
(2) Date: Jan. 13, 2017

(87) PCT Pub. No.: WO2016/009262
PCT Pub. Date: Jan. 21, 2016

(65) Prior Publication Data
US 2017/0214355 A1 Jul. 27, 2017

(30) Foreign Application Priority Data

Jul. 15, 2014 (JP) ................................. 2014-144712

(51) Int. Cl.
*H02P 7/14* (2006.01)
*H02P 27/08* (2006.01)
*H02M 7/5387* (2007.01)

(52) U.S. Cl.
CPC ......... *H02P 27/08* (2013.01); *H02M 7/53871* (2013.01)

(58) Field of Classification Search
USPC .................... 318/504, 794, 796, 817, 769
See application file for complete search history.

(56) References Cited

U.S. PATENT DOCUMENTS

2012/0126776 A1* 5/2012 Kagimura ............. H02M 5/458
323/304
2014/0239857 A1* 8/2014 Kamada ................ H02P 25/092
318/254.2

(Continued)

FOREIGN PATENT DOCUMENTS

JP 2000-023490 A 1/2000
JP 2009-098091 A 5/2009

(Continued)

*Primary Examiner* — Bentsu Ro
*Assistant Examiner* — Iftekhar Mustafa
(74) *Attorney, Agent, or Firm* — Hunton Andrews Kurth LLP

(57) ABSTRACT

A controller for an electric motor system is provided. The electric motor system includes a DC power supply, a power converter, a smoothing capacitor, a three-phase AC motor, and a current sensor. The controller includes an electronic control unit. The electronic control unit is configured to control the power converter such that an inter-terminal voltage of the smoothing capacitor matches a first reference value. The first reference value is a value which is determined as the inter-terminal voltage of the smoothing capacitor when a phase current is equal to a second reference value. The electronic control unit is configured to correct a detection value of the current sensor so as to decrease a difference between the detection value and the second reference value when the inter-terminal voltage matches the first reference value and the detection value does not match the second reference value.

7 Claims, 17 Drawing Sheets

(56) References Cited

U.S. PATENT DOCUMENTS

| 2016/0190971 | A1 | 6/2016 | Yamakawa et al. |
| 2016/0204729 | A1 | 7/2016 | Yamakawa et al. |
| 2016/0211792 | A1 | 7/2016 | Yamakawa et al. |

FOREIGN PATENT DOCUMENTS

| JP | 2010-022162 | A  | 1/2010 |
| JP | 2015-035897 | A  | 2/2015 |
| JP | 2015-056919 | A  | 3/2015 |
| WO | 2015/025437 | A1 | 2/2015 |

* cited by examiner

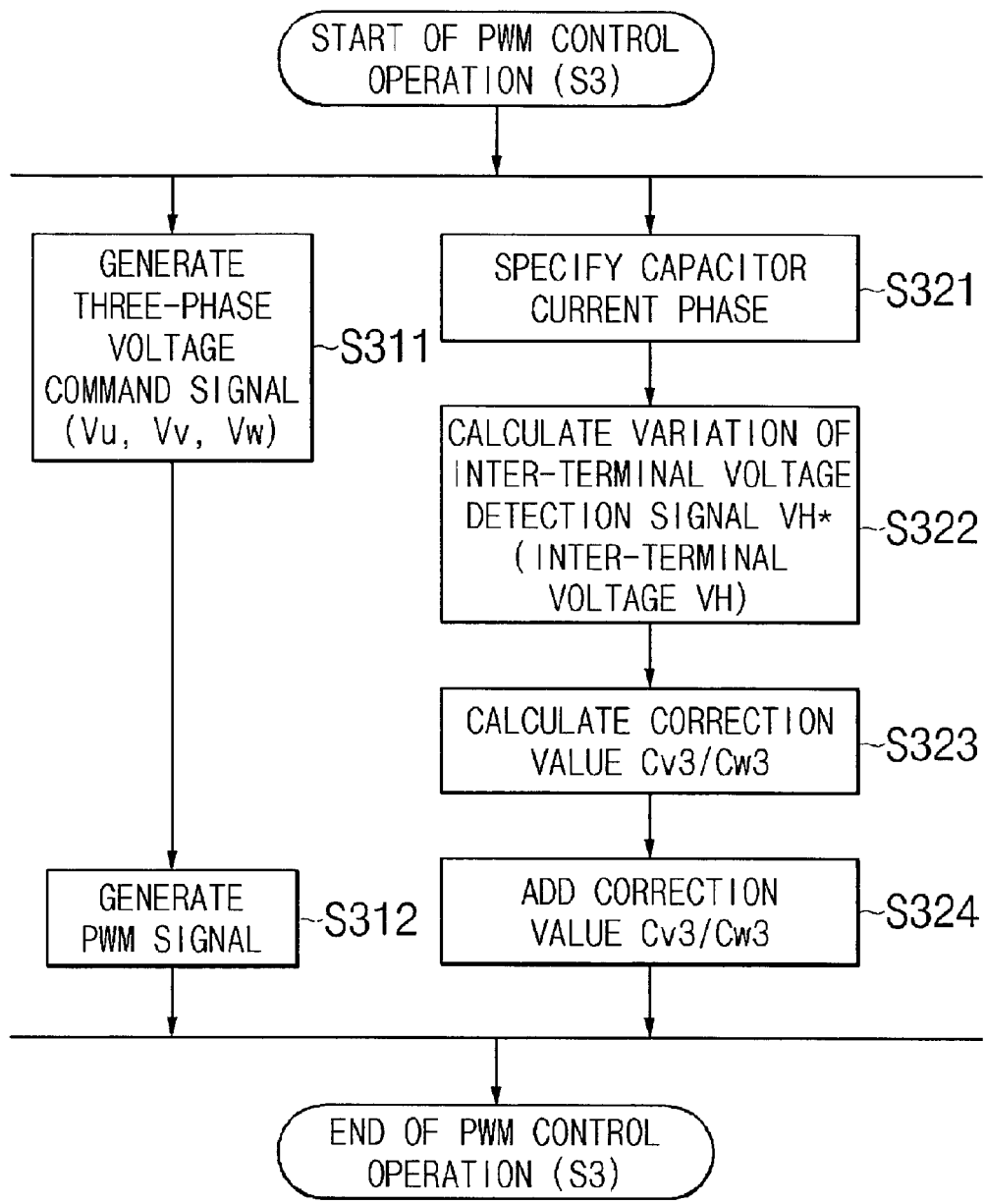

| PERIOD | INTERMEDIATE PHASE VOLTAGE COMMAND SIGNAL | CAPACITOR CURRENT PHASE |
|---|---|---|
| #1/#7 | U-PHASE VOLTAGE COMMAND SIGNAL | V PHASE |
| #2/#8 | W-PHASE VOLTAGE COMMAND SIGNAL | V PHASE |
| #3/#9 | W-PHASE VOLTAGE COMMAND SIGNAL | U PHASE |
| #4/#10 | V-PHASE VOLTAGE COMMAND SIGNAL | U PHASE |
| #5/#11 | V-PHASE VOLTAGE COMMAND SIGNAL | W PHASE |
| #6/#12 | U-PHASE VOLTAGE COMMAND SIGNAL | W PHASE |

CONTROLLER FOR ELECTRIC MOTOR SYSTEM

CROSS-REFERENCE TO RELATED APPLICATIONS

This is a national phase application based on the PCT International Patent Application No. PCT/IB2015/001169 filed Jul. 13, 2015, claiming priority to Japanese Patent Application No. 2014-144712 filed Jul. 15, 2014, the entire contents of both of which are incorporated herein by reference.

BACKGROUND OF THE INVENTION

1. Field of the Invention

The present invention relates to a technical field of, for example, a controller that controls an electric motor system having a three-phase AC motor.

2. Description of Related Art

An example of a control method of driving a three-phase AC motor is pulse width modulation (PWM) control. The PWM control is to control a power converter (for example, an inverter) that converts a DC voltage (DC power) into an AC voltage (AC power) based on a magnitude relation between a phase voltage command signal, which is set from the viewpoint of matching phase currents supplied to a three-phase AC motor with a desired value, and a carrier signal of a predetermined frequency.

Another example of the control method of controlling a three-phase AC motor is rectangular wave control. The rectangular wave control is to control a power converter (for example, an inverter) that converts a DC voltage (DC power) into an AC voltage (AC power) based on a rectangular wave signal of which the phase has been adjusted from the viewpoint of matching a torque of a three-phase AC motor, which is estimated from phase currents supplied to the three-phase AC motor, with a target torque.

When a power converter is controlled, phase currents are generally detected by current sensors. Here, there is a possibility that a detection signal of a current sensor will include an error (for example, an offset error in which a signal obtained by adding a DC component to an actual current signal is output as a detection signal, or a gain error in which a signal obtained by amplifying or attenuating an actual current signal is output as a detection signal). Therefore, techniques of correcting an error included in a detection signal of a current sensor in order to improve detection accuracy of the current sensor have been proposed. For example, Japanese Patent Application Publication No. 2000-023490 (JP 2000-023490 A) discloses a technique of correcting an error while a PWM signal for operating an inverter is not output from a controller (that is, while a phase current does not flow and until charging of a capacitor is completed after an electric motor is started).

An example of a document of the related art is Japanese Patent Application Publication No. 2009-098091 (JP 2009-098091 A).

SUMMARY OF THE INVENTION

However, in the technique disclosed in JP 2000-023490 A, an error is corrected only just after an electric motor is started. Accordingly, an error is not corrected while the electric motor is driven.

The present invention provides a controller for an electric motor system that can suitably correct a detection signal of a current sensor (for example, suitably correct an error included in a detection signal).

According to an aspect of the invention, there is provided a controller for an electric motor system. The electric motor system includes a DC power supply, a power converter, a smoothing capacitor, a three-phase AC motor, and a current sensor. The power converter is configured to convert DC power supplied from the DC power supply into AC power output. The smoothing capacitor is electrically connected in parallel to the power converter. The three-phase AC motor is driven by the AC power output from the power converter. The current sensor is configured to detect a phase current supplied to the three-phase AC motor and output a detection value indicating a value of the phase current itself or a characteristic of the phase current. The controller includes an electronic control unit (ECU). The electronic control unit is configured to control the power converter such that an inter-terminal voltage of the smoothing capacitor matches a first reference value. The first reference value is a value which is determined as the inter-terminal voltage of the smoothing capacitor when the phase current is equal to a second reference value. The electronic control unit is configured to correct the detection value such that a difference between the detection value and the second reference value is decreased when the inter-terminal voltage matches the first reference value and the detection value does not match the second reference value.

According to this aspect, the controller can control the electric motor system. The electric motor system which is controlled by the controller includes the DC power supply, the smoothing capacitor, the power converter, the three-phase AC motor, and the current sensor. The DC power supply outputs DC power (that is, a DC voltage or a DC current). The smoothing capacitor is electrically connected in parallel to the power converter. Typically, the smoothing capacitor is electrically connected in parallel to the DC power supply. Accordingly, the smoothing capacitor can suppress a variation in the inter-terminal voltage of the smoothing capacitor (that is, an inter-terminal voltage of at least one of the DC power supply and the power converter). The power converter converts the DC power supplied from the DC power supply into AC power (typically, three-phase AC power). As a result, the three-phase AC motor is driven using the AC power output from the power converter to the three-phase AC motor. The current sensor detects a phase current supplied to the three-phase AC motor. The current sensor outputs a detection value indicating the value of the phase current itself or a characteristic of the phase current.

The controller includes an electronic control unit for controlling the electric motor system.

The electronic control unit adjusts the inter-terminal voltage of the smoothing capacitor. Specifically, the electronic control unit adjusts the inter-terminal voltage such that the inter-terminal voltage matches the first reference value (for example, a target value of the inter-terminal voltage). At this time, the electronic control unit may adjust the inter-terminal voltage such that the inter-terminal voltage itself matches the first reference value. Alternatively, the electronic control unit may adjust the inter-terminal voltage such that an arbitrary parameter (for example, an average value of the inter-terminal voltage) indicating a characteristic of the inter-terminal voltage matches the first reference value. In any case, the electronic control unit can be said to adjust the inter-terminal voltage such that the inter-terminal voltage matches the first reference value. That is, in the invention, the "inter-terminal voltage" may mean an arbitrary parameter indicating a characteristic of the inter-terminal voltage in addition to or instead of the inter-terminal voltage.

Here, the first reference value which may be a target value of the inter-terminal voltage is set from a viewpoint that a state in which the phase current (that is, the phase current itself or an arbitrary parameter indicating a characteristic of the phase current) matches the second reference value is derived due to a state in which the inter-terminal voltage matches the first reference value. In other words, taking it into consideration that a variation in the inter-terminal voltage causes a variation in the phase current and a variation in the phase current causes a variation in the inter-terminal voltage, the first reference value can be said to be set from a viewpoint that a state in which the inter-terminal voltage matches the first reference value is derived due to the state in which the phase current matches the second reference value. That is, the electronic control unit adjusts the inter-terminal voltage such that the phase current matches the second reference value by causing the inter-terminal voltage to match the first reference value. In other words, the electronic control unit adjusts the inter-terminal voltage such that the inter-terminal voltage matches the first reference value by causing the phase current to match the second reference value.

The electronic control unit corrects the detection signal output from the current sensor. Specifically, the electronic control unit corrects the detection signal such that a difference between the detection value and the second reference value is decreased in comparison with before the correction, when the inter-terminal voltage matches the first reference value and the detection value indicating the value of the phase current itself or a characteristics of the detection signal does not match the second reference value. That is, the electronic control unit corrects the detection value such that the difference between the corrected detection value and the second reference value is less than the difference between the non-corrected detection value and the second reference value.

Here, as described above, the electronic control unit adjusts the inter-terminal voltage such that the phase current matches the second reference value by causing the inter-terminal voltage to match the first reference value. Therefore, when the electronic control unit adjusts the inter-terminal voltage, the phase current will match the second reference value in a state in which the inter-terminal voltage matches the first reference value. Accordingly, when the detection signal of the current sensor does not include an error, the detection value will match the second reference value in a state in which the inter-terminal voltage matches the first reference value. In other words, when the detection value does not match the second reference value in a state in which the inter-terminal voltage matches the first reference value, it is considered that there is a high possibility that the detection value of the current sensor will include an error (that is, a difference or gap between the detection signal of the current sensor and the actual phase current).

Taking into consideration a relationship between the state in which the inter-terminal voltage matches the first reference value and the state in which the phase current and the detection value match the second reference value, the electronic control unit can estimate that the detection value includes an error when the detection value does not match the second reference value in the state in which the inter-terminal voltage matches the first reference value. As a result, when it is estimated that the detection value includes an error (that is, the detection value does not match the second reference value), the electronic control unit can correct the detection value of the current sensor so as to suppress or exclude an influence of the error included in the detection signal of the current sensor by correcting the detection value such that the difference between the detection value and the second reference value is decreased (preferably to be zero).

In addition, the electronic control unit can adjust the inter-terminal voltage even when a predetermined period of time passes after the electric motor system is started (for example, while the electric motor system is driven in a normal mode) as well as just after the electric motor system is started. The electronic control unit can correct the detection value of the current sensor even when a predetermined period of time passes after the electric motor system is started as well as just after the electric motor system is started. Accordingly, even when a predetermined period of time passes after the electric motor system is started as well as just after the electric motor system is started, the electronic control unit can correct the detection value of the current sensor so as to suppress or exclude an influence of the error when the detection value of the current sensor includes the error.

In this way, the controller for an electric motor system according to the invention can suitably correct the detection value of the current sensor (that is, suitably correct an error included in the detection value of the current sensor).

In the controller according to the aspect, the electronic control unit may be configured to specify a target phase which is a phase in which a phase current for mainly defining a capacitor current flowing through the smoothing capacitor flows. The electronic control unit may be configured to control the phase current having the target phase of the power converter such that the inter-terminal voltage matches the first reference value. According to this aspect, the electronic control unit adjusts the inter-terminal voltage by adjusting the phase current having the target phase.

Here, the target phase is a phase in which the phase current for mainly defining the capacitor current flowing through the smoothing capacitor flows. In other words, the target phase is a phase of a phase current with which a period of time in which the phase current matches the capacitor current flowing through the smoothing capacitor is the longest in a predetermined period of time. Accordingly, taking it into consideration that the phase current having the target phase defines the capacitor current, the possibility that a variation in the phase current having the target phase causes a variation in the inter-terminal voltage is higher than the possibility that a variation in the phase current having a phase other than the target phase causes a variation in the inter-terminal voltage.

Accordingly, the electronic control unit can more efficiently or more suitably adjust the inter-terminal voltage by adjusting the phase current having the target phase in comparison with a case in which the phase current having a phase other than the target phase is adjusted.

In the controller according to the aspect, the power converter may include switching elements corresponding to phases of the three-phase AC motor respectively. The electronic control unit may be configured to control a switching timing of one of the switching elements corresponding to the target phase such that the inter-terminal voltage matches the first reference value.

According to this aspect, the electronic control unit can adjust the phase current having the target phase by adjusting the switching timing of the switching element corresponding to the target phase. As a result, the electronic control unit can suitably adjust the inter-terminal voltage.

In the controller according to the aspect, the power converter may include a switching element corresponding to an upper arm and a switching element corresponding to a lower arm for each phase. The electronic control unit may be configured to cause a first switching timing to lead when the inter-terminal voltage is less than the first reference value. The first switching timing is a timing at which the switching element corresponding to the upper arm of the target phase switches from an ON state to an OFF state. The electronic control unit may be configured to cause the first switching timing to lag when the inter-terminal voltage is greater than the first reference value.

According to this aspect, the electronic control unit can adjust the phase current having the target phase by adjusting the first switching timing at which the switching element corresponding to the upper arm of the target phase is switched from the ON state to the OFF state (specifically, by causing the first switching timing to lead or lag). As a result, the electronic control unit can suitably adjust the inter-terminal voltage.

Specifically, the electronic control unit adjusts the first switching timing such that the first switching timing leads in comparison with the first switching timing before the adjustment when the inter-terminal voltage is less than the first reference value. At this time, for example, the electronic control unit adjusts the first switching timing such that the first switching timing leads by the difference between the inter-terminal voltage and the first reference value in comparison with the first switching timing before the adjustment. As a result, the period of time in which the switching element in the upper arm is in the ON state when the first switching timing is adjusted is shorter than the period of time in which the switching element in the upper arm is in the ON state when the first switching timing is not adjusted. When the period of time in which the switching element in the upper arm is in the ON state becomes shorter, the capacitor current flowing through the smoothing capacitor decreases. When the capacitor current flowing through the smoothing capacitor decreases, the power consumption of the three-phase AC motor decreases and thus the inter-terminal voltage of the smoothing capacitor increases. Accordingly, the electronic control unit can adjust the inter-terminal voltage such that the inter-terminal voltage less than the first reference value matches the first reference value.

On the other hand, the electronic control unit adjusts the first switching timing such that the first switching timing lags in comparison with the first switching timing before the adjustment when the inter-terminal voltage is greater than the first reference value. At this time, for example, the electronic control unit adjusts the first switching timing such that the first switching timing lags by the difference between the inter-terminal voltage and the first reference value in comparison with the first switching timing before the adjustment. As a result, the period of time in which the switching element in the upper arm is in the ON state when the first switching timing is adjusted is longer than the period of time in which the switching element in the upper arm is in the ON state when the first switching timing is not adjusted. When the period of time in which the switching element in the upper arm is in the ON state becomes longer, the capacitor current flowing through the smoothing capacitor increases. When the capacitor current flowing through the smoothing capacitor increases, the power consumption of the three-phase AC motor increases and thus the inter-terminal voltage of the smoothing capacitor decreases. Accordingly, the electronic control unit can adjust the inter-terminal voltage such that the inter-terminal voltage greater than the first reference value matches the first reference value.

In the controller according to the aspect, the power converter may include a switching element corresponding to an upper arm and a switching element corresponding to a lower arm for each phase. The electronic control unit may be configured to cause a second switching timing to lag when the inter-terminal voltage is less than the first reference value. The second switching timing is a timing at which the switching element corresponding to the upper arm of the target phase switches from an OFF state to an ON state. The electronic control unit may be configured to cause the second switching timing to lead when the inter-terminal voltage is greater than the first reference value.

According to this aspect, the electronic control unit can adjust the phase current having the target phase by adjusting the second switching timing at which the switching element corresponding to the target phase is switched from the OFF state to the ON state (specifically, by causing the second switching timing to lead or lag). As a result, the electronic control unit can suitably adjust the inter-terminal voltage.

Specifically, the electronic control unit adjusts the second switching timing such that the second switching timing lags in comparison with the second switching timing before the adjustment when the inter-terminal voltage is less than the first reference value. At this time, for example, the electronic control unit adjusts the second switching timing such that the second switching timing lags by the difference between the inter-terminal voltage and the first reference value in comparison with the second switching timing before the adjustment. As a result, the period of time in which the switching element in the upper arm is in the ON state when the second switching timing is adjusted is shorter than the period of time in which the switching element in the upper arm is in the ON state when the second switching timing is not adjusted. Accordingly, as described above, the inter-terminal voltage of the smoothing capacitor increases. Accordingly, the electronic control unit can adjust the inter-terminal voltage such that the inter-terminal voltage less than the first reference value matches the first reference value.

On the other hand, the electronic control unit adjusts the second switching timing such that the second switching timing leads in comparison with the second switching timing before the adjustment when the inter-terminal voltage is less than the first reference value. At this time, for example, the electronic control unit adjusts the second switching timing such that the second switching timing leads by the difference between the inter-terminal voltage and the first reference value in comparison with the second switching timing before the adjustment. As a result, the period of time in which the switching element in the upper arm is in the ON state when the second switching timing is adjusted is longer than the period of time in which the switching element in the upper arm is in the ON state when the second switching timing is not adjusted. Accordingly, as described above, the inter-terminal voltage of the smoothing capacitor decreases. Accordingly, the electronic control unit can adjust the inter-terminal voltage such that the inter-terminal voltage greater than the first reference value matches the first reference value.

In the controller according to the aspect, the electronic control unit may be configured to correct the detection value such that the detection value matches the second reference value, when the inter-terminal voltage matches the first reference value and the detection value indicating the value of the phase current does not match the second reference value.

According to this aspect, the electronic control unit can correct the detection value of the current sensor so as to exclude an influence of an error included in the detection value of the current sensor by correcting the detection value such that the value of the detection signal matches the second reference value (that is, such that a difference between the value of the detection signal itself and the second reference value is zero).

In the controller according to the aspect, the electronic control unit may be configured to correct the detection value such that a difference between the detection value and the second reference value is decreased, when the inter-terminal voltage matches the first reference value and the detection value indicating an average value of the phase current does not match the second reference value.

According to this aspect, the electronic control unit can correct the detection value such that the difference between the detection value indicating the average value (that is, an average signal level) and the second reference value (that is, zero level) decreases (preferably becomes zero). As a result, the electronic control unit can correct the detection value of the current sensor so as to suppress or exclude an influence of an error included in the detection value of the current sensor.

In the controller according to the aspect, the electronic control unit may be configured to specify a target phase which is a phase in which a phase current for mainly defining a capacitor current flowing through the smoothing capacitor flows. The electronic control unit may be configured to correct the detection value such that a difference between the detection value and the second reference value is decreased, when the power converter operates in a first operation mode based on a rectangular wave control mode, the inter-terminal voltage matches the first reference value, and the detection value does not match the second reference value. The electronic control unit may be configured to correct the detection value of the phase current having the target phase such that the inter-terminal voltage matches the first reference value when the power converter operates in a second operation mode based on a pulse width modulation control mode.

According to this aspect, the electronic control unit specifies a target phase. The target phase is the same as described above and thus is not repeatedly described herein.

The electronic control unit corrects the detection signal output from the current sensor when the power converter operates in the second operation mode based on the pulse width modulation control mode. Here, in the second operation mode, the electronic control unit corrects the detection value in a correction mode other than the correction mode which is performed in the first operation mode. Specifically, in the second operation mode, the electronic control unit corrects the detection value of the current sensor such that the inter-terminal voltage matches the first reference value. In the invention, particularly, the electronic control unit corrects the detection value of the current sensor, which detects the phase current having the target phase specified by the electronic control unit, such that the inter-terminal voltage matches the first reference value.

Here, when the detection signal of the current sensor includes an error, the controller erroneously recognizes that the detection signal of the current sensor is an actual phase current. Accordingly, when it is assumed that the controller controls the electric motor system such that the detection signal of the current sensor becomes a desired current value, the actual phase current varies by the error. For example, the actual phase current becomes a value obtained by adding or subtracting the error to or from the desired current value.

At this time, as will be described in detail later with reference to the accompanying drawings, a variation in the phase current having a predetermined phase (for example, a variation with respect to the desired current value) may cause a variation in the inter-terminal voltage of the smoothing capacitor in a period of time in which the predetermined phase is the target phase. On the other hand, the variation in the phase current having the predetermined phase cannot cause or hardly causes a variation in the inter-terminal voltage of the smoothing capacitor in a period of time in which the predetermined phase is not the target phase. Accordingly, when the inter-terminal voltage varies in a state in which the target phase is specified, there is a high possibility that the phase current having the target phase varies. As a result, taking it into consideration that an error included in the detection signal of the current sensor may cause a variation in the phase current, there is a high possibility that an error is included in the detection value of the current sensor which detects the phase current having the target phase when the phase current having the target phase varies.

Taking into consideration a relationship between the variation in the phase current having the target phase and the variation in the inter-terminal voltage of the smoothing capacitor, in the invention, the electronic control unit specifies the target phase and thus the current sensor of which the detection signal includes an error is individually specified even when the electric motor system includes plural current sensors. For example, even when the electric motor system includes at least two current sensors which individually detects phase currents of at least two phases, the current sensor of the at least two current sensors of which the detection signal includes an error is individually specified. In addition, when a target phase is specified in the second operation mode, the electronic control unit corrects the detection value of the current sensor which has detected the phase current having the target phase such that the inter-terminal voltage matches the first reference value (for example, a variation in the inter-terminal voltage is zero). As a result, the electronic control unit can correct the detection value of the current sensor so as to exclude an influence of an error when the detection value of the current sensor includes the error.

Furthermore, the electronic control unit can specify the target phase in accordance with a generated phase voltage command signal even when a predetermined period of time passes after the electric motor system is started (for example, while the electric motor system is driven in a normal mode) as well as just after the electric motor system is started. In the second operation mode, the electronic control unit can correct the detection value of the current sensor based on the detectable inter-terminal voltage of the smoothing capacitor even when a predetermined period of time passes after the electric motor system is started as well as just after the electric motor system is started. Accordingly, even when a predetermined period of time passes after the electric motor system is started as well as just after the electric motor system is started, the electronic control unit can correct the detection value of the current sensor so as to exclude an influence of an error when the detection value of the current sensor includes the error.

In this way, according to the aspect, in both modes of the first operation mode and the second operation mode, it is possible to correct the detection value of the current sensor so as to exclude an influence of an error when the detection value of the current sensor includes the error.

That is, according to the aspect, the subject that corrects the detection signal of the current sensor is changed depending on the operation mode of the power converter. Specifically, the electronic control unit corrects the detection value such that a difference between the detection value and the second reference value is decreased when the power converter operates in the first operation mode based on the rectangular wave control mode, the inter-terminal voltage matches the first reference value, and the detection value does not match the second reference value. On the other hand, the electronic control unit corrects the detection value of the phase current having the target phase such that the inter-terminal voltage matches the first reference value when the power converter operates in the second operation mode based on the pulse width modulation control mode. As a result, even when the power converter operates in any of the first operation mode and the second operation mode, it is possible to correct a detection signal of a current sensor so as to suppress or exclude an influence of an error included in the detection signal of the current sensor.

Operations and other advantages of the invention will become apparent from embodiments to be described below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flowchart illustrating the flow of an inverter control operation (PWM control operation) which is performed by the PWM control unit;

DETAILED DESCRIPTION OF EMBODIMENTS

Hereinafter, embodiments of a controller for an electric motor system will be described. Embodiments of the controller for an electric motor system will be described using a vehicle 1 to which the controller for an electric motor system is applied. Here, the controller for an electric motor system may be applied to arbitrary equipment (particularly, arbitrary equipment including an electric motor) other than a vehicle.

The configuration of the vehicle 1 according to this embodiment will be first described below with reference to FIGS. 1 to 4.

Figure 1:
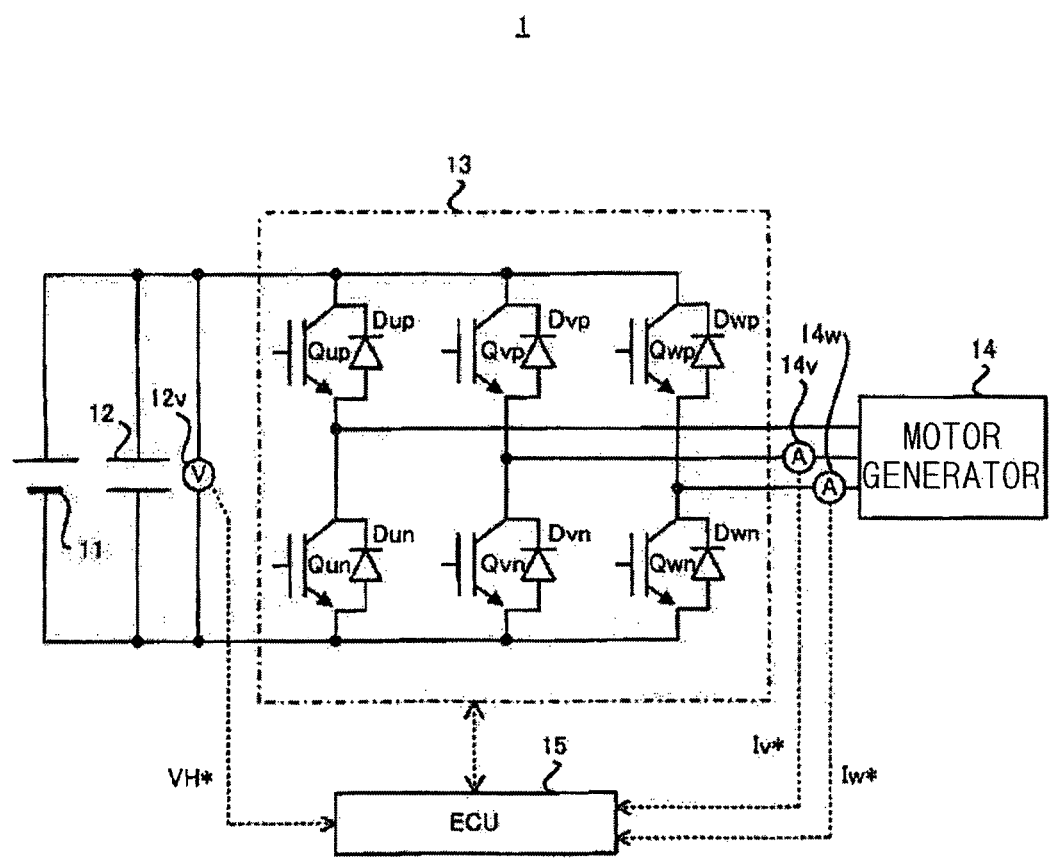
FIG. 1 is a block diagram illustrating the entire configuration of a vehicle according to a first embodiment.

The entire configuration of the vehicle 1 according to this embodiment will be first described with reference to FIG. 1. FIG. 1 is a block diagram illustrating the entire configuration of the vehicle 1 according to a first embodiment.

As illustrated in FIG. 1, the vehicle 1 includes a DC power supply 11, a smoothing capacitor 12, a voltage sensor 12V, an inverter 13 which is an example of the "power converter", a motor generator 14 which is an example of the "three-phase AC motor", a V-phase current sensor 14v, a W-phase current sensor 14w, and an electronic control unit (ECU) 15.

The DC power supply 11 is an electric storage device which is rechargeable. Examples of the DC power supply 11 include a secondary battery (for example, a nickel hydrogen battery or a lithium ion battery) or a capacitor (for example, an electric double phase capacitor or a large-capacity capacitor).

The smoothing capacitor 12 is a voltage-smoothing capacitor connected between a positive electrode line of the DC power supply 11 and a negative electrode line of the DC power supply 11. That is, the smoothing capacitor 12 is a capacitor for smoothing a variation of an inter-terminal voltage VH between the positive electrode line and the negative electrode line.

The voltage sensor 12V detects the inter-terminal voltage VH of the smoothing capacitor 12. A detection signal (hereinafter, appropriately referred to as an "inter-terminal voltage detection signal VH*") of the voltage sensor 12V is appropriately referred to by the ECU 15.

The inverter 13 converts DC power (DC voltage) supplied from the DC power supply 11 into AC power (three-phase AC voltages) output. In order to convert DC power (DC voltage) into AC power (three-phase AC voltages) output, the inverter 13 includes a U-phase arm including a p-side switching element Qup and an n-side switching element Qun, a V-phase arm including a p-side switching element Qvp and an n-side switching element Qvn, and a W-phase arm including a p-side switching element Qwp and an n-side switching element Qwn. The arms of the inverter 13 are connected in parallel between the positive electrode line and the negative electrode line. The p-side switching element Qup and the n-side switching element Qun are connected in series between the positive electrode line and the negative electrode line. The same is true between the p-side switching element Qvp and the n-side switching element Qvn and between the p-side switching element Qwp and the n-side switching element Qwn. The p-side switching element Qup is connected to a rectifier diode Dup for causing a current to flow from an emitter terminal of the p-side switching element Qup to a collector terminal of the p-side switching element Qup. Similarly, the n-side switching elements Qun to Qwn are connected to a rectifier diodes Dun to Dwn, respectively. A midpoint between an upper arm (that is, each p-side switching element) and a lower arm (that is, each n-side switching element) of each phase arm in the inverter 13 is connected to each phase winding (each phase coil) of the motor generator 14. As a result, AC power (three-phase AC voltages) output which is generated through the conversion operation of the inverter 13 is supplied to the motor generator 14.

The motor generator 14 is a three-phase AC motor generator. The motor generator 14 is driven to generate a torque for causing the vehicle 1 to run. The torque generated from the motor generator 14 is transmitted to driving wheels via a drive shaft which is mechanically connected to a rotation shaft of the motor generator 14. Also, the motor generator 14 may perform power regeneration (power generation) when the vehicle 1 is braked.

The V-phase current sensor 14v detects a phase current (that is, V-phase current Iv) flowing in the V-phase winding of the motor generator 14. A detection signal of the V-phase current sensor 14v (hereinafter, appropriately referred to as a "V-phase current detection signal Iv*") is appropriately referred to by the ECU 15.

The W-phase current sensor 14w detects a phase current (that is, W-phase current Iw) flowing in the W-phase winding of the motor generator 14. A detection signal of the W-phase current sensor 14w (hereinafter, appropriately referred to as a "W-phase current detection signal Iw*") is appropriately referred to by the ECU 15.

The ECU 15 is an electronic control unit that controls the operation of the vehicle 1. Particularly, in the first embodiment, the ECU 15 performs an inverter control operation for controlling the operation of the inverter 13. The inverter control operation of the ECU 15 will be described in detail later (see FIG. 5 and the like).

Subsequently, the configuration (particularly, the configuration for controlling the operation of the inverter 13) of the ECU 15 of the vehicle 1 according to this embodiment will be described with reference to FIGS. 2 to 4.

The entire configuration of the ECU 15 will be first described with reference to FIG. 2. FIG. 2 is a block diagram illustrating the entire configuration of the ECU 15.

Figure 2:
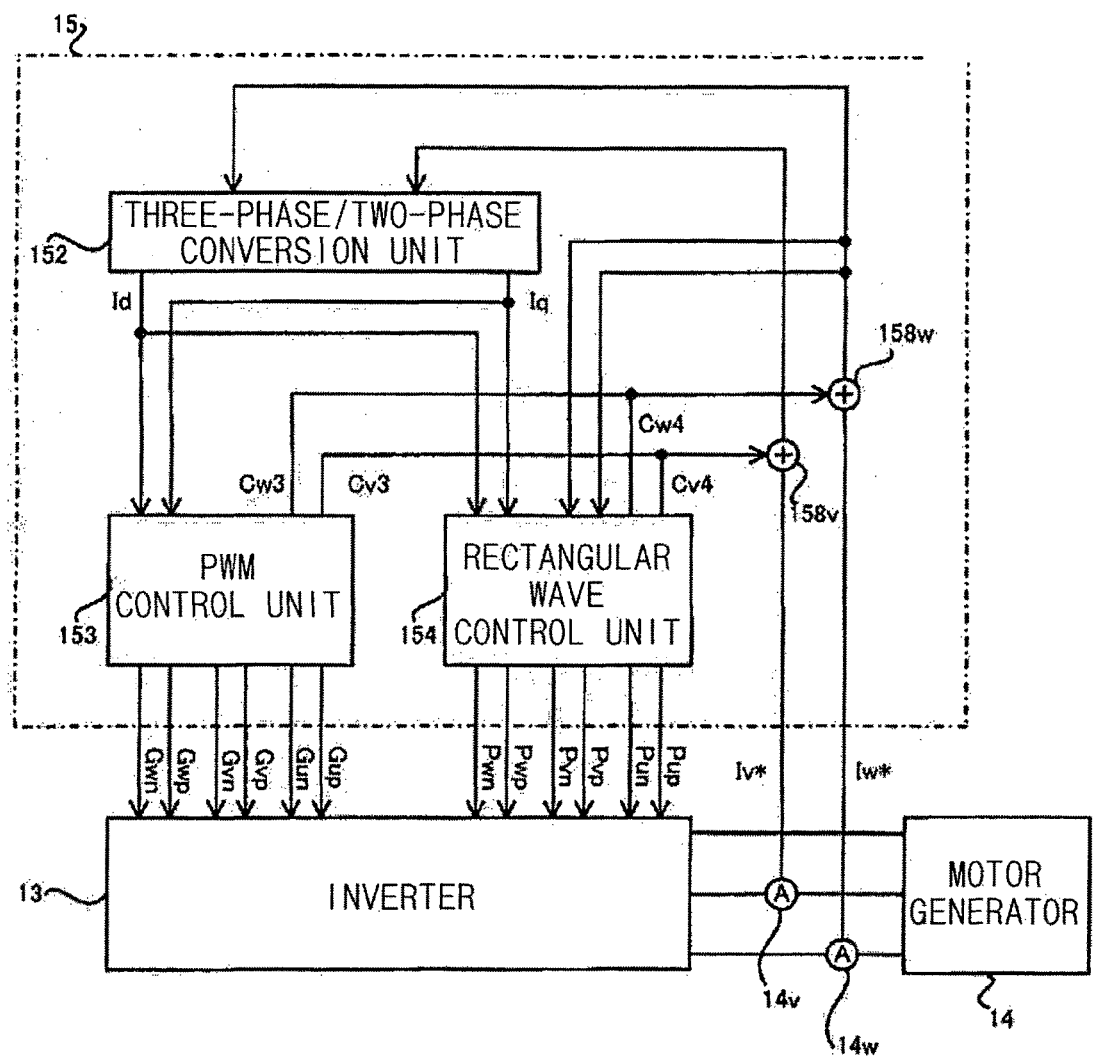
FIG. 2 is a block diagram illustrating the entire configuration of an electronic control unit (ECU)

As illustrated in FIG. 2, the ECU 15 includes a three-phase/two-phase conversion unit 152, a pulse width modulation (PWM) control unit 153, a rectangular wave control unit 154, an adder 158 (specifically, a V-phase adder 158v and a W-phase adder 158w).

The three-phase/two-phase conversion unit 152 acquires a V-phase current detection signal Iv* from the V-phase current sensor 14v. The three-phase/two-phase conversion unit 152 acquires a W-phase current detection signal Iw* from the W-phase current sensor 14w. The three-phase/two-phase conversion unit 152 converts the V-phase current detection signal Iv* and the W-phase current detection signal Iw* corresponding to three-phase current values into a d-axis current Id and a q-axis current Iq corresponding to two-phase current values. The three-phase/two-phase conversion unit 152 outputs the d-axis current Id and the q-axis current Iq to the PWM control unit 153 and the rectangular wave control unit 154.

The PWM control unit 153 controls the inverter 13 based on the d-axis current Id and the q-axis current Iq output from the three-phase/two-phase conversion unit 152. Particularly, the PWM control unit 153 controls the inverter 13 based on a PWM control mode. Specifically, the PWM control unit 153 generates a PWM signal from the d-axis current Id and the q-axis current Iq based on the PWM control mode so as to control the inverter 13. As a result, the inverter 13 operates based on the PWM signal.

The PWM control unit 153 calculates a correction value (V-phase correction value) Cv3 for correcting the V-phase current detection signal Iv* which is a detection signal of the current sensor 14v and a correction value (W-phase correction value) Cw3 for correcting the W-phase current detection signal Iw* which is a detection signal of the current sensor 14w. The configuration of the PWM control unit 153 will be described in detail later (see FIG. 3).

The rectangular wave control unit 154 controls the inverter 13 based on the d-axis current Id and the q-axis current Iq output from the three-phase/two-phase conversion, unit 152. Particularly, the rectangular wave control unit 154 controls the inverter 13 based on a rectangular wave control mode. Specifically, the rectangular wave control unit 154 generates a rectangular wave signal from the d-axis current Id and the q-axis current Iq based on the rectangular wave control mode so as to control the inverter 13. As a result, the inverter 13 operates based on the rectangular wave signal.

In addition, the rectangular wave control unit 154 calculates a correction value (V-phase correction value) Cv4 for correcting the V-phase current detection signal Iv* which is a detection signal of the current sensor 14v and a correction value (W-phase correction value) Cw4 for correcting the W-phase current detection signal Iw* which is a detection signal of the current sensor 14w. The configuration of the rectangular wave control unit 154 will be described in detail later (see FIG. 4).

The V-phase adder 158v adds the V-phase correction value Cv3 calculated by the PWM control unit 153 and the V-phase correction value Cv4 calculated by the rectangular wave control unit 154 to the V-phase current detection signal Iv*. Accordingly, an error αv included in the V-phase current detection signal Iv* is corrected (typically cancelled).

The W-phase adder 158w adds the W-phase correction value Cw3 calculated by the PWM control unit 153 and the W-phase correction value Cw4 calculated by the rectangular wave control unit 154 to the W-phase current detection signal Iw*. Accordingly, an error αw included in the W-phase current detection signal Iw* is corrected (typically cancelled).

The operation of calculating the V-phase correction value Cv3 and the W-phase correction value Cw3 which is performed by the PWM control unit 153, the operation of adding the V-phase correction value Cv3 which is performed by the V-phase adder 158v, and the operation of adding the W-phase correction value Cw3 which is performed by the W-phase adder 158w are an example of the "correction" which is performed by the ECU 15. Details thereof will be described later.

The operation of calculating the V-phase correction value Cv4 and the W-phase correction value Cw4 which is performed by the rectangular wave control unit 154, the operation of adding the V-phase correction value Cv4 which is performed by the V-phase adder 158v, and the operation of adding the W-phase correction value Cw4 which is performed by the W-phase adder 158w are an example of the "correction" which is performed by the ECU 15. Details thereof will be described later.

Subsequently, the configuration of the PWM control unit 153 of the ECU 15 will be described below with reference to FIG. 3. FIG. 3 is a block diagram illustrating the configuration of the PWM control unit 153 of the ECU 15.

Figure 3:
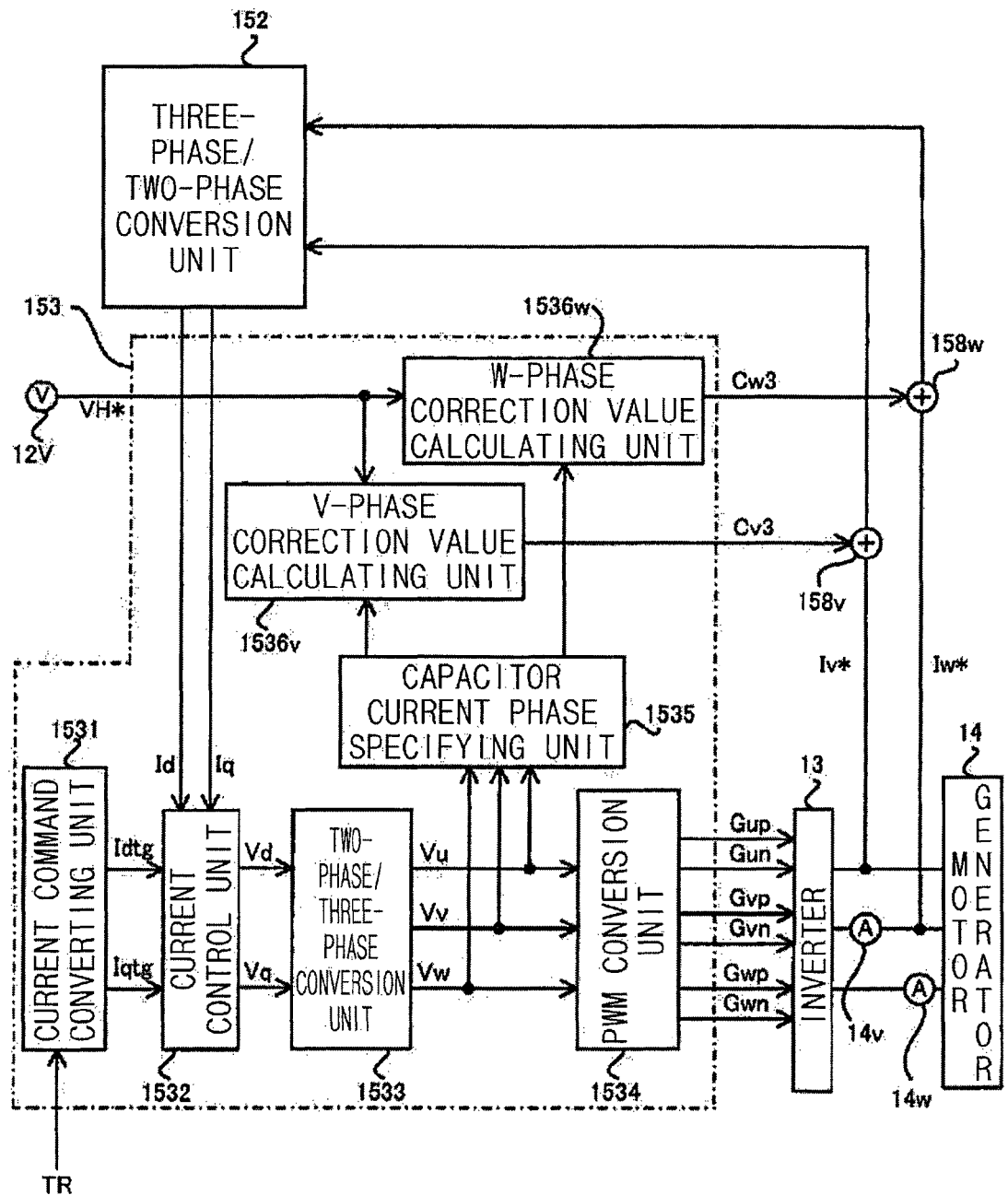
FIG. 3 is a block diagram illustrating a configuration of a PWM control unit of the ECU.

As illustrated in FIG. 3, the PWM control unit 153 includes a current command converting unit 1531, a current control unit 1532, a two-phase/three-phase conversion unit 1533, a PWM conversion unit 1534, a capacitor current phase specifying unit 1535, and a correction value calculating unit 1536 (specifically, a V-phase correction value calculating unit 1536v and a W-phase correction value calculating unit 1536w).

The current command converting unit 1531 generates a two-phase current command signal (that is, a d-axis current command signal Idtg and a q-axis current command signal Iqtg) based on a torque command value TR of the motor generator 14. The current command converting unit 1531 outputs the d-axis current command signal Idtg and the q-axis current command signal Iqtg to the current control unit 1532.

The current control unit 1532 generates a d-axis voltage command signal Vd and a q-axis voltage command signal Vq corresponding to the two-phase voltage command signal based on differences between the d-axis current command signal Idtg and the q-axis current command signal Iqtg output from the current command converting unit 1531 and the d-axis current Id and the q-axis current Iq output from the three-phase/two-phase conversion unit 152. At this time, the current control unit 1532 may generate the d-axis voltage command signal Vd and the q-axis voltage command signal Vq, for example, using proportional integral (PI) control or proportional integral derivative (PID) control. The current control unit 1532 outputs the d-axis voltage command signal Vd and the q-axis voltage command signal Vq to the two-phase/three-phase conversion unit 1533.

The two-phase/three-phase conversion unit 1533 converts the d-axis voltage command signal Vd and the q-axis voltage command signal Vq into a U-phase voltage command signal Vu, a V-phase voltage command signal Vv, and a W-phase voltage command signal Vw which are three-phase voltage command signals. The two-phase/three-phase conversion unit 1533 outputs the U-phase voltage command signal Vu, the V-phase voltage command signal Vv, and the W-phase voltage command signal Vw to the PWM conversion unit 1534.

The PWM conversion unit 1534 generates a U-phase PWM signal Gup for driving the p-side switching element Qup and a U-phase PWM signal Gun for driving the n-side switching element Qun based on a magnitude relation between a carrier signal C having a predetermined carrier frequency f and the U-phase voltage command signal Vu. The PWM conversion unit 1534 generates a V-phase PWM signal Gyp for driving the p-side switching element Qvp and a V-phase PWM signal Gvn for driving the n-side switching element Qvn based on a magnitude relation between the carrier signal C and the V-phase voltage command signal Vv. The PWM conversion unit 1534 generates a W-phase PWM signal Gwp for driving the p-side switching element Qwp and a W-phase PWM signal Gwn for driving the n-side switching element Qwn based on a magnitude relation between the carrier signal C and the W-phase voltage command signal Vw.

The PWM conversion unit 1534 outputs the U-phase PWM signals Gup and Gun, the V-phase PWM signals Gyp and Gvn, and the W-phase PWM signals Gwp and Gwn to the inverter 13. As a result, the inverter 13 operates based on the U-phase PWM signals Gup and Gun, the V-phase PWM signals Gyp and Gvn, and the W-phase PWM signals Gwp and Gwn.

The capacitor current phase specifying unit 1535 specifies a capacitor current phase which is an example of the "target phase." In other words, the capacitor current phase specifying unit 1535 specifies whether the capacitor current phase is a U phase, whether the capacitor current phase is a V phase, and whether the capacitor current phase is a W phase. In other words, the capacitor current phase specifying unit 1535 specifies which phase of the U phase, the V phase, and the W phase is the capacitor current phase. The capacitor current phase is a phase in which a phase current mainly defining a capacitor current (that is, a current flowing through the smoothing capacitor 12) Ic flows. For example, as will be described later in detail, taking it into consideration that the waveform of the capacitor current Ic is a shape including a repeated intermittent pulse (see FIG. 8 or the like), the capacitor current phase is a phase in which a phase current having a signal level of substantially the same shape as a virtual line connecting peak values of pulse waveforms of the capacitor current Ic (that is, a phase current forming a virtual line connecting the peak values of the capacitor current Ic) flows.

Details of the operation of the capacitor current phase specifying unit 1535 will be described later in detail (see FIGS. 9 to 11). Accordingly, detailed description of the operation of the capacitor current phase specifying unit 1535 will not be described herein.

The V-phase correction value calculating unit 1536v calculates the V-phase correction value Cv3 for correcting the V-phase current detection signal Iv*. Specifically, the V-phase correction value calculating unit 1536v calculates the V-phase correction value Cv3 required for correcting (typically, cancelling) an error αv included in the V-phase current detection signal Iv*.

Particularly, it is preferable that the V-phase correction value calculating unit 1536v calculate the V-phase correction value Cv3 based on an inter-terminal voltage detection signal VH* input to the V-phase correction value calculating unit 1536v in a period in which the capacitor current phase is specified to be the V phase. Specifically, when an error αv is included in the V-phase current detection signal Iv*, the error αv can cause an increase or decrease of the inter-terminal voltage VH (that is, the inter-terminal voltage detection signal VH*). More specifically, the error αv can cause an increase or decrease of the average signal level of the inter-terminal voltage VH (that is, the inter-terminal voltage detection signal VH*) in a predetermined period. Accordingly, in this embodiment, the V-phase correction value calculating unit 1536v may calculate the V-phase correction value Cv3 such that a variation of the inter-terminal voltage detection signal VH* (that is, a variation of the average signal level of the inter-terminal voltage detection signal VH* in the predetermined period) is substantially zero. In other words, the V-phase correction value calculating unit 1536v may calculate the V-phase correction value Cv3 such that the inter-terminal voltage detection signal VH* (that is, the average signal level of the inter-terminal voltage detection signal VH* in the predetermined period) matches a target voltage value which is an example of the "first reference value."

The W-phase correction value calculating unit 1536w calculates the W-phase correction value Cw3 for correcting the W-phase current detection signal Iw*. Specifically, the W-phase correction value calculating unit 1536w calculates the W-phase correction value Cw3 required for correcting an error αw included in the W-phase current detection signal Iw*.

Particularly, it is preferable that the W-phase correction value calculating unit 1536w calculate the W-phase correction value Cw3 based on an inter-terminal voltage detection signal VH* input to the W-phase correction value calculating unit 1536w in a period in which the capacitor current phase is specified to be the W phase. Specifically, when an error αw is included in the W-phase current detection signal Iw*, the error αw can cause an increase or decrease of the inter-terminal voltage VH (that is, the inter-terminal voltage detection signal VH*). More specifically, the error αw can cause an increase or decrease of the average signal level of the inter-terminal voltage VH (that is, the inter-terminal voltage detection signal VH*) in a predetermined period. Accordingly, in this embodiment, the W-phase correction value calculating unit 1536w may calculate the W-phase correction value Cw3 such that a variation of the inter-terminal voltage detection signal VH* (that is, a variation of the average signal level of the inter-terminal voltage detection signal VH* in the predetermined period) is substantially zero. In other words, the W-phase correction value calculating unit 1536w may calculate the W-phase correction value Cw3 such that the inter-terminal voltage detection signal VH* (that is, the average signal level of the inter-terminal voltage detection signal VH* in the predetermined period) matches a target voltage value""

For the purpose of simplification of description, unless particularly mentioned, the "inter-terminal voltage detection signal VH*" and the "inter-terminal voltage VH" in the operation of correcting an error αv and an error αw mean the "average signal level of the inter-terminal voltage detection signal VH* in a predetermined period" and the "average signal level of the inter-terminal voltage VH in a predetermined period," respectively. Here, the "inter-terminal voltage detection signal VH*" and the "inter-terminal voltage VH" may mean "the inter-terminal voltage detection signal VH* itself or an arbitrary parameter indicating a characteristic of the inter-terminal voltage detection signal VH*" and "the inter-terminal voltage VH itself or an arbitrary parameter indicating a characteristic of the inter-terminal voltage VH," respectively.

Details of the operations of the V-phase correction value calculating unit 1536v and the W-phase correction value calculating unit 1536w will be described later. Accordingly, detailed description of the operations of the V-phase correction value calculating unit 1536v and the W-phase correction value calculating unit 1536w will not be made herein.

Subsequently, the configuration of the rectangular wave control unit 154 of the ECU 15 will be described with reference to FIG. 4. FIG. 4 is a block diagram illustrating the configuration of the rectangular wave control unit 154 of the ECU 15.

Figure 4:
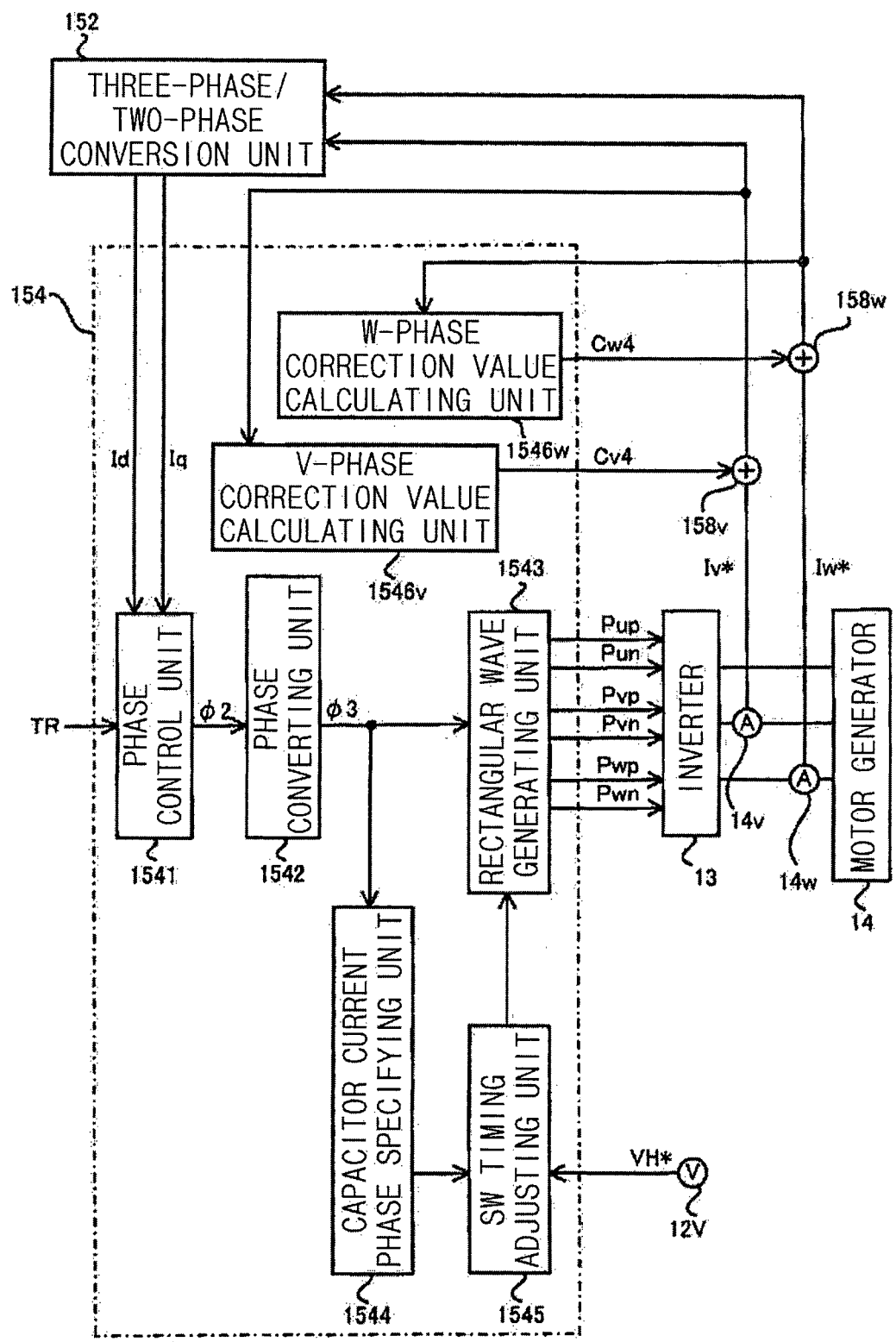
FIG. 4 is a block diagram illustrating a configuration of a rectangular wave control unit of the ECU.

As illustrated in FIG. 4, the rectangular wave control unit 154 includes a phase control unit 1541, a phase converting unit 1542, a rectangular wave generating unit 1543, a capacitor current phase specifying unit 1544, a switching (SW) timing adjusting unit 1545, and a correction value calculating unit 1546 (specifically, a V-phase correction value calculating unit 1546v and a W-phase correction value calculating unit 1546w).

The phase control unit 1541 estimates a torque (output torque) output from the motor generator 14 based on a d-axis current Id and a q-axis current Iq output from the three-phase/two-phase conversion unit 152. The phase control unit 1541 calculates a voltage phase command signal φ2 (typically, a voltage phase command signal φ2 in the d-q coordinate system) such that the estimated output torque matches a torque command value TR.

The phase converting unit 1542 converts the voltage phase command signal φ2 in the d-q coordinate system into a voltage phase command signal φ3 in the three-phase fixed coordinate system. For example, the phase converting unit 1542 may convert the voltage phase command signal φ2 into the voltage phase command signal φ3 such that a value obtained by adding a detected angle θ of a resolver (hereinafter, appropriately referred to as a "resolver angle") detecting a rotation angle of the motor generator 14 and 90° to the voltage phase command signal φ2 is the voltage phase command signal φ3. In other words, the phase converting unit 1542 may convert the voltage phase command signal φ2 into the voltage phase command signal φ3 using an equation of voltage phase command signal φ3=voltage phase command signal φ2+resolver angle θ+90°.

The rectangular wave generating unit 1543 generates a U-phase rectangular wave signal Pup for driving the p-side switching element Qup and a U-phase rectangular wave signal Pun for driving the n-side switching element Qun based on the voltage phase command signal φ3. In addition, the rectangular wave generating unit 1543 generates a V-phase rectangular wave signal Pvp for driving the p-side switching element Qvp and a V-phase rectangular wave signal Pvn for driving the n-side switching element Qvn based on the voltage phase command signal φ3. In addition, the rectangular wave generating unit 1543 generates a W-phase rectangular wave signal Pwp for driving the p-side switching element Qwp and a W-phase rectangular wave signal Pwn for driving the n-side switching element Qwn based on the voltage phase command signal φ3.

The rectangular wave generating unit 1543 outputs the U-phase rectangular wave signals Pup and Pun, the V-phase rectangular wave signals Pvp and Pvn, and the W-phase rectangular wave signals Pwp and Pwn to the inverter 13. As a result, the inverter 13 operates based on the U-phase rectangular wave signals Pup and Pun, the V-phase rectangular wave signals Pvp and Pvn, and the W-phase rectangular wave signals Pwp and Pwn.

The capacitor current phase specifying unit 1544 specifies the capacitor current phase, similarly to the capacitor current phase specifying unit 1535 of the PWM control unit 153. Here, the capacitor current phase specifying unit 1544 specifies the capacitor current phase in a way other than that of the capacitor current phase specifying unit 1535. Details of the operation of the capacitor current phase specifying unit 1544 will be described later (see FIG. 15). Accordingly, detailed description of the operation of the capacitor current phase specifying unit 1544 will not be made herein.

The SW timing adjusting unit 1545 adjusts a phase of at least one of a rising edge and a falling edge of a rectangular wave signal (that is, a timing which is hereinafter appropriately referred to as a "switching angle of a rectangular wave signal") of the capacitor current phase out of the rectangular wave signals generated by the rectangular wave generating unit 1543. Particularly, the SW timing adjusting unit 1545 adjusts the switching angle of the rectangular wave signal based on the inter-terminal voltage detection signal VH* input from the voltage sensor 12V to the SW timing adjusting unit 1545. Details of the operation of the SW timing adjusting unit 1545 will be described later (see FIG. 16). Accordingly, detailed description of the operation of the SW timing adjusting unit 1545 will not be made herein.

The V-phase correction value calculating unit 1546v calculates a V-phase correction value Cv4 for correcting the V-phase current detection signal Iv*. Specifically, the V-phase correction value calculating unit 1546v calculates the V-phase correction value Cv4 required for correcting (typically, cancelling) an error αv included in the V-phase current detection signal Iv*.

Particularly, the V-phase correction value calculating unit 1546v calculates the V-phase correction value Cv4 in a state in which the inter-terminal voltage detection signal VH* matches the target voltage value (that is, the variation of the inter-terminal voltage detection signal VH* is substantially zero) through adjustment of the switching angle of the rectangular wave signal by the SW timing adjusting unit 1545. The V-phase correction value calculating unit 1546v may calculate the V-phase correction value Cv4 based on a difference between the average signal level of the V-phase current detection signal Iv* and a reference signal level. For example, the V-phase correction value calculating unit 1546v may calculate the V-phase correction value Cv4 such that the difference between the average signal level of the V-phase current detection signal Iv* and the reference signal level is zero (that is, such that the average signal level of the V-phase current detection signal Iv* matches the reference signal level).

The W-phase correction value calculating unit 1546w calculates a W-phase correction value Cw4 for correcting the W-phase current detection signal Iw*. Specifically, the W-phase correction value calculating unit 1546w calculates the W-phase correction value Cw4 required for correcting (typically, cancelling) an error αw included in the W-phase current detection signal Iw*.

Particularly, the W-phase correction value calculating unit 1546w calculates the W-phase correction value Cw4 in a state in which the inter-terminal voltage detection signal VH* matches the target voltage value (that is, the variation of the inter-terminal voltage detection signal VH* is substantially zero) through adjustment of the switching angle of the rectangular wave signal by the SW timing adjusting unit 1545. The W-phase correction value calculating unit 1546w may calculate the W-phase correction value Cw4 based on a difference between the average signal level of the W-phase current detection signal Iw* and a reference signal level. For example, the W-phase correction value calculating unit 1546w may calculate the W-phase correction value Cw4 such that the difference between the average signal level of the W-phase current detection signal Iw* and the reference signal level is zero.

For the purpose of simplification of description, the reference signal level=zero (that is, zero level) is assumed in the below description. Here, the reference signal level may be an arbitrary signal level other than the zero level. The reference signal level is an example of the "second reference value."

Subsequently, an inverter control operation (that is, an inverter control operation which is performed by the ECU 15) which is performed in the vehicle 1 according to this embodiment will be described with reference to FIGS. 5 to 17.

Figure 5:
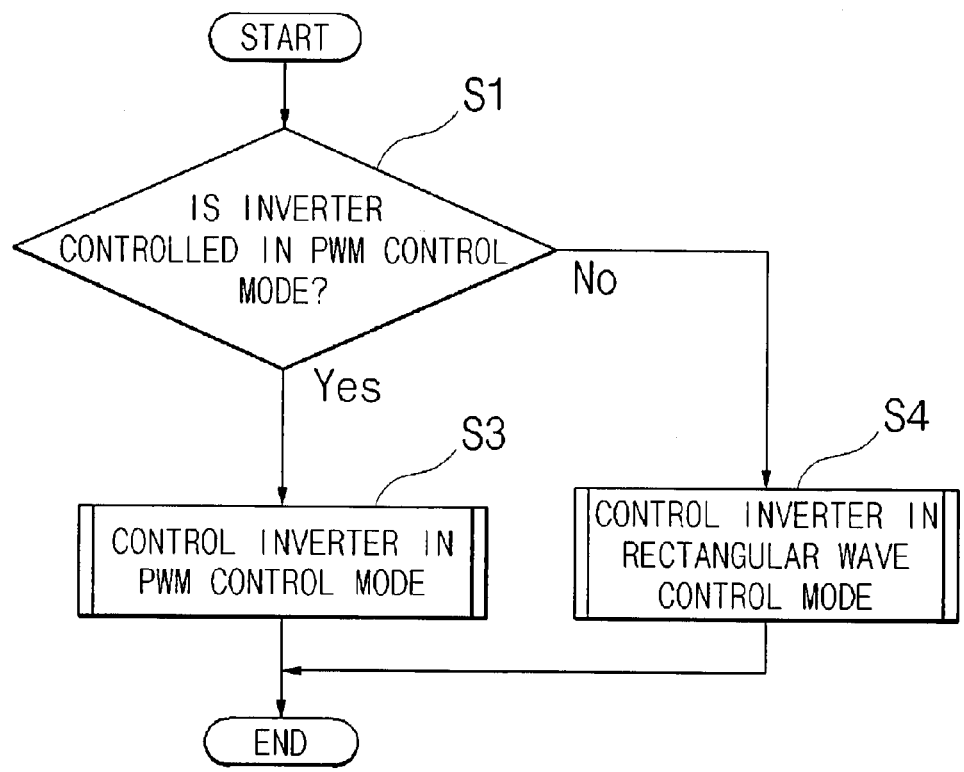
FIG. 5 is a flowchart illustrating the entire flow of an inverter control operation according to the first embodiment.

First, the entire flow of the inverter control operation (that is, the inverter control operation which is performed by the ECU 15) which is performed in the vehicle 1 according to this embodiment will be described with reference to FIG. 5. FIG. 5 is a flowchart illustrating the entire flow of the inverter control operation (that is, the inverter control operation which is performed by the ECU 15) which is performed in the vehicle 1 according to this embodiment.

As illustrated in FIG. 5, the ECU 15 determines whether to control the inverter 13 in the PWM control mode (step S1). For example, the ECU 15 may determine whether to control the inverter 13 in the PWM control mode based on a load of the vehicle 1. Specifically, when the load of the vehicle 1 is relatively low, the ECU 15 may determine that the inverter 13 should be controlled in the PWM control mode. On the other hand, when the load of the vehicle 1 is relatively high, the ECU 15 may determine that the inverter 13 should not be controlled in the PWM control mode (for example, the inverter 13 should be controlled in the rectangular wave control mode).

When it is determined in step S1 that the inverter 13 should be controlled in the PWM control mode (YES in step S1), the PWM control unit 153 controls the inverter 13 in the PWM control mode (step S3). At this time, the rectangular wave control unit 154 may not operate.

On the other hand, when it is determined in step S1 that the inverter 13 should not be controlled in the PWM control mode (NO in step S1), the rectangular wave control unit 154 controls the inverter 13 in the rectangular wave control mode (step S4). At this time, the PWM control unit 153 may not operate.

Subsequently, a flow of the inverter control operation (PWM control operation) which is performed by the PWM control unit 153 will be described with reference to FIG. 6. FIG. 6 is a flowchart illustrating the flow of the inverter control operation (PWM control operation) which is performed by the PWM control unit 153.

As illustrated in FIG. 6, the two-phase/three-phase conversion unit 1533 generates three-phase voltage command signals (that is, a U-phase voltage command signal Vu, a V-phase voltage command signal Vv, and a W-phase voltage command signal Vw) (step S311). The method of generating the three-phase voltage command signals is the same as described above with reference to FIG. 3.

Thereafter, the PWM conversion unit 1534 generates the U-phase PWM signals Gup and Gun based on the magnitude relation between the carrier signal C and the U-phase voltage command signal Vu (step S312). Similarly, the PWM conversion unit 1534 generates the V-phase PWM signals Gyp and Gvn based on the magnitude relation between the carrier signal C and the V-phase voltage command signal Vv (step S312). Similarly, the PWM conversion unit 1534 generates the W-phase PWM signals Gwp and Gwn based on the magnitude relation between the carrier signal C and the W-phase voltage command signal Vw (step S312). As a result, the inverter 13 operates based on the PWM signals.

In parallel with the operations of steps S311 and S312, the PWM control unit 153 corrects an error αv included in the V-phase current detection signal Iv* which is a detection signal of the V-phase current sensor 14v (steps S321 to S324). The PWM control unit 153 corrects an error αw included in the W-phase current detection signal Iw* which is a detection signal of the W-phase current sensor 14w (steps S321 to S324).

Figure 7A:
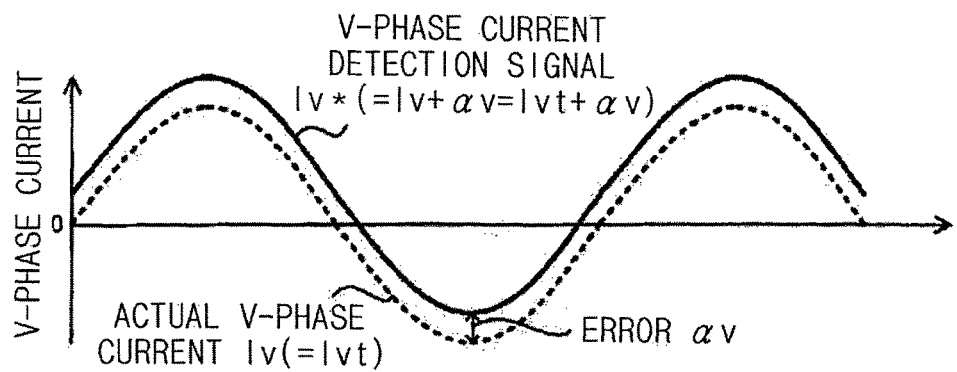
FIG. 7A is a graph illustrating a relationship between a V-phase current detection signal and an actual V-phase current when an error occurs in the V-phase current detection signal.
Figure 7B:
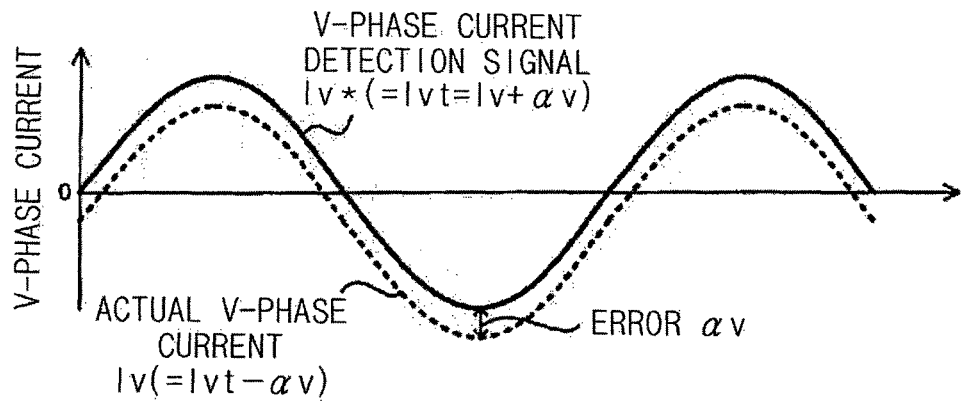
FIG. 7B is a graph illustrating a relationship between a V-phase current detection signal and an actual V-phase current after PWM control is performed when an error occurs in the V-phase current detection signal.
Figure 8A:
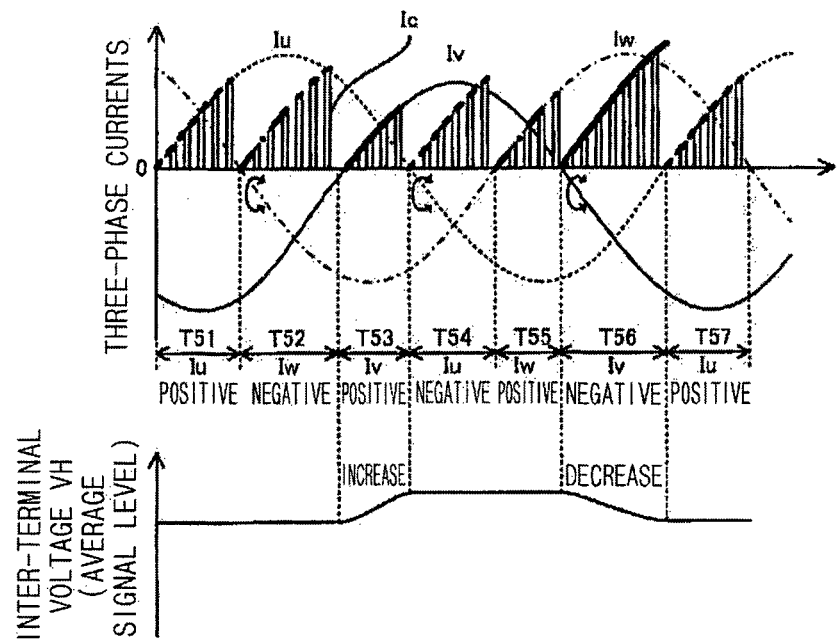
FIG. 8A is a graph illustrating a relationship among three-phase currents (that is, a U-phase current, a V-phase current, and a W-phase current), a capacitor current, and an inter-terminal voltage when an error is included in a V-phase current detection signal.
Figure 8B:
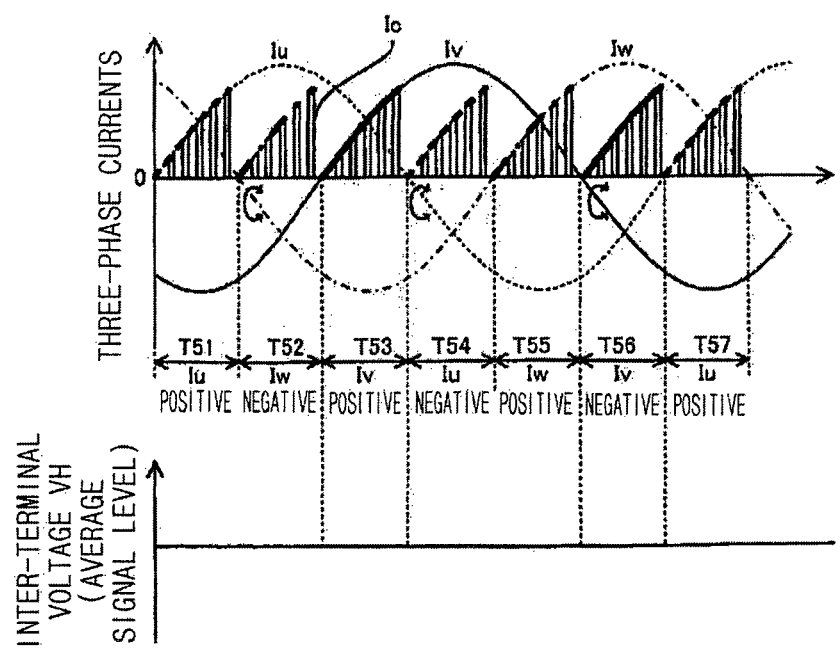
FIG. 8B is a graph illustrating a relationship among three-phase currents (that is, a U-phase current, a V-phase current, and a W-phase current), a capacitor current, and an inter-terminal voltage when an error is not included in a V-phase current detection signal.

Here, a situation in which the error αv is included in the V-phase current detection signal Iv* will be described with reference to FIGS. 7A to 8B. FIGS. 7A and 7B are graphs illustrating a relationship between the V-phase current detection signal Iv* and the actual V-phase current Iv when an error αv occurs in the V-phase current detection signal Iv*. FIGS. 8A and 8B are graphs illustrating a relationship among three-phase currents (that is, a U-phase current Iu, a V-phase current Iv, and a W-phase current Iw), the capacitor current Ic, and the inter-terminal voltage VH when an error αv is included in the V-phase current detection signal Iv* and a relationship among the three-phase currents, the capacitor current Ic, and the inter-terminal voltage VH when an error αv is not included in the V-phase current detection signal Iv*.

As illustrated in FIG. 7A, it is assumed that an error αv is included in the V-phase current detection signal Iv*. That is, it is assumed that the V-phase current detection signal Iv* is a value obtained by adding the error αv to the actual V-phase current Iv (that is, V-phase current detection signal Iv*=actual V-phase current Iv+error αv). It is assumed that the actual V-phase current Iv initially matches a target current value Ivt. In the example illustrated in FIG. 7A, the error αv is an offset error.

Here, it is assumed that the PWM control unit 153 does not perform the operations of steps S321 to S324 (that is, the operations of correcting the error αv) illustrated in FIG. 6 but performs the operations of steps S311 and S312 illustrated in FIG. 6 based on the V-phase current detection signal Iv* including the error αv. In this case, as illustrated in FIG. 7B, the PWM control unit 153 controls the operation of the inverter 13 such that the V-phase current detection signal Iv* matches the target current value Ivt by performing the operations of steps S311 and S312 illustrated in FIG. 6. That is, the PWM control unit 153 controls the operation of the inverter 13 such that the waveform of the V-phase current detection signal Iv* is changed from the waveform indicated by a solid line in FIG. 7A to the waveform indicated by a solid line in FIG. 7B (that is, such that the V-phase current detection signal Iv* decreases by the error αv). As a result, the actual V-phase current Iv becomes a current which is smaller by the error αv than the target current value Ivt (that is, V-phase current Iv=target current value Ivt−error αv). That is, the actual V-phase current Iv becomes a current which is smaller than an originally-desired current value (that is, the target current value Ivt). More specifically, since the inverter 13 is controlled based on the V-phase current detection signal Iv* including the error αv (that is, without correcting the error αv through the operations of steps S321 to S324 illustrated in FIG. 6), the V-phase current Iv which originally matches the target current value Ivt as indicated by a dotted waveform in FIG. 7A becomes a current which is smaller by the error αv than the target current value Ivt as indicated by a dotted waveform in FIG. 7B.

Here, the phase currents sequentially define the capacitor current Ic flowing through the smoothing capacitor 12. Typically, the phase current of which the signal level is zero defines the capacitor current Ic until a predetermined period of time passes after the signal level of the phase current becomes zero. For example, FIG. 8A illustrates an example in which the capacitor current Ic in period T51 is defined by a positive U-phase current Iu, the capacitor current Ic in period T52 is defined by a negative W-phase current Iw, the capacitor current Ic in period T53 is defined by a positive V-phase current Iv, the capacitor current Ic in period T54 is defined by a negative U-phase current Iu, the capacitor current Ic in period T55 is defined by a positive W-phase current Iw, and the capacitor current Ic in period T56 is defined by a negative V-phase current Iv. When the capacitor current Ic is defined by a negative phase current, the phase current obtained by inverting the polarity of the negative phase current can be said to define the capacitor current Ic. Accordingly, in the example illustrated in FIG. 8A, the capacitor current phase in period T51 and period T54 is the U phase. Similarly, in the example illustrated in FIG. 8A, the capacitor current phase in period T52 and period T55 is the W phase. Similarly, in the example illustrated in FIG. 8A, the capacitor current phase in period T53 and period T56 is the V phase. After period T57, the states in periods T51 to T56 are repeated.

When the V-phase current detection signal Iv* includes an error αv, the actual V-phase current Iv has a value which is smaller by the error αv than the target current value Ivt as illustrated in FIG. 7B. On the other hand, it is assumed that the actual U-phase current Iu and the actual W-phase current Iw match the target current value Ivt. In this case, the signal waveform of the V-phase current Iv is shifted in the minus direction from the signal waveform of the U-phase current Iu and the W-phase current Iw. Accordingly, the capacitor current Ic in the period in which the capacitor current phase is the V phase increases or decreases in comparison with the capacitor current Ic in the period in which the capacitor current phase is the U phase or the W phase. Specifically, the capacitor current Ic in period T53 in which the capacitor current phase is the V phase decreases in comparison with the capacitor current Ic in the period in which the capacitor current phase is the U phase or the W phase. On the other hand, the capacitor current Ic in period T56 in which the capacitor current phase is the V phase increases in comparison with the capacitor current Ic in the period in which the capacitor current phase is the U phase or the W phase.

The decrease of the capacitor current Ic means a decrease in power consumption in the motor generator 14. As a result, as illustrated in FIG. 8A, the decrease of the capacitor current Ic causes an increase of the inter-terminal voltage VH of the smoothing capacitor 12. Similarly, the increase of the capacitor current Ic means an increase in power consumption in the motor generator 14. As a result, as illustrated in FIG. 8A, the increase of the capacitor current Ic causes a decrease of the inter-terminal voltage VH of the smoothing capacitor 12. Therefore, when the V-phase current detection signal Iv* includes an error (offset error) αv, the inter-terminal voltage VH varies at the same frequency as the frequency of the V-phase current detection signal Iv*. That is, when the V-phase current detection signal Iv* includes an error αv, the inter-terminal voltage VH does not match the target voltage value.

Although not illustrated for the purpose of simplification of description, the inter-terminal voltage VH varies at a frequency which is double the frequency of the V-phase current detection signal Iv* when the V-phase current detection signal Iv* includes an error (gain error) αv.

FIGS. 7A and 8A illustrate an example in which the V-phase current detection signal Iv* includes an error αv. However, the same is true when the W-phase current detection signal Iw* includes an error αw. That is, when the W-phase current detection signal Iw* includes an error (offset error) αw, the inter-terminal voltage VH varies at the same frequency as the frequency of the W-phase current detection signal Iw*. That is, when the W-phase current detection signal Iw* includes an error αw, the inter-terminal voltage VH does not match the target voltage value.

On the other hand, when the V-phase current detection signal Iv* does not include an error αv, the signal waveform of the V-phase current Iv is not shifted in the minus direction from the signal waveforms of the U-phase current Iu and the W-phase current Iw as illustrated in FIG. 8B. Accordingly, the capacitor current Ic in the period in which the capacitor current phase is the V phase is substantially the same as the capacitor current Ic in the period in which the capacitor current phase is the U phase or the W phase. As a result, when the V-phase current detection signal Iv* does not include an error (offset error) αv, the inter-terminal voltage VH does not vary easily.

The variation of the inter-terminal voltage VH may cause malfunction of the switching elements or the like of the inverter 13. Accordingly, a countermeasure for enhancing a withstanding voltage characteristic of the switching elements or the like is required to prevent the malfunction of the switching elements or the like. Alternatively, a countermeasure for enhancing capacitance of the smoothing capacitor is required to suppress the variation of the inter-terminal voltage VH. However, these countermeasures cause an increase in cost and thus cannot be said to be best countermeasures. Therefore, in this embodiment, a countermeasure of correcting an error αv which is included in the V-phase current detection signal Iv* and which serves as a reason for causing the variation of the original inter-terminal voltage VH is employed.

Therefore, the countermeasure of correcting an error αv will be reviewed. When an error Δv is included in the V-phase current detection signal Iv* (that is, the V-phase current detection signal Iv* does not match the V-phase current Iv), the inter-terminal voltage VH varies in the period in which the capacitor current phase is the V phase. Similarly, when an error αw is included in the W-phase current detection signal Iw* (that is, the W-phase current detection signal Iw* does not match the W-phase current Iw), the inter-terminal voltage VH varies in the period in which the capacitor current phase is the W phase. Accordingly, the PWM control unit 153 can recognize that the possibility that an error is included in at least one of the V-phase current detection signal Iv* and the W-phase current detection signal Iw* is relatively high by detecting the variation of the inter-terminal voltage VH. The PWM control unit 153 can specify whether an error is included in both the V-phase current detection signal Iv* and the W-phase current detection signal Iw* by specifying the capacitor current phase in the period in which the inter-terminal voltage VH varies. That is, the PWM control unit 153 can individually specify and correct the error αv included in the V-phase current detection signal Iv* and the error αw included in the W-phase current detection signal Iw* by specifying the capacitor current phase and monitoring the variation of the inter-terminal voltage VH.

More specifically, the PWM control unit 153 can recognize that an error αv is included in the V-phase current detection signal Iv* when the inter-terminal voltage detection signal VH* varies while the V phase is specified as the capacitor current phase. Accordingly, in this case, the PWM control unit 153 calculates the V-phase correction value Cv3 for correcting the V-phase current detection signal Iv* such that the variation of the inter-terminal voltage detection signal VH* in the period in which the V phase is specified as the capacitor current phase is zero, while the V phase is specified as the capacitor current phase. In other words, the PWM control unit 153 calculates the V-phase correction value Cv3 for correcting the V-phase current detection signal Iv* such that the inter-terminal voltage detection signal VH* in the period in the V phase is specified as the capacitor current phase matches the target voltage value, while the V phase is specified as the capacitor current phase. As a result, the PWM control unit 153 can correct (cancel) the error αv included in the V-phase current detection signal Iv*.

Similarly, the PWM control unit 153 can recognize that an error αw is included in the W-phase current detection signal Iw* when the inter-terminal voltage detection signal VH* varies while the W phase is specified as the capacitor current phase. Accordingly, in this case, the PWM control unit 153 calculates the W-phase correction value Cw3 for correcting the W-phase current detection signal Iw* such that the variation of the inter-terminal voltage detection signal VH* in the period in which the W phase is specified as the capacitor current phase is zero, while the W phase is specified as the capacitor current phase. In other words, the PWM control unit 153 calculates the W-phase correction value Cw3 for correcting the W-phase current detection signal Iw* such that the inter-terminal voltage detection signal VH* in the period in the W phase is specified as the capacitor current phase matches the target voltage value, while the W phase is specified as the capacitor current phase. As a result, the PWM control unit 153 can correct (cancel) the error αw included in the W-phase current detection signal Iw*.

The operation of correcting an error αv included in the V-phase current detection signal Iv* and an error αw included in the W-phase current detection signal Iw* will be subsequently described below with reference to FIG. 6 again.

As illustrated in FIG. 6, in order to correct the error αv included in the V-phase current detection signal Iv* and the error αw included in the W-phase current detection signal Iw*, the capacitor current phase specifying unit 1535 first specifies the capacitor current phase (step S321).

In this embodiment, the capacitor current phase specifying unit 1535 uses the magnitude relation of the three-phase voltage commands (that is, the U-phase voltage command signal Vu, the V-phase voltage command signal Vv, and the W-phase voltage command signal Vw) to specify the capacitor current phase.

Specifically, in this embodiment, the capacitor current phase specifying unit 1535 first specifies an intermediate-phase voltage command signal of which the signal level is not the highest nor the lowest out of the U-phase voltage command signal Vu, the V-phase voltage command signal Vv, and the W-phase voltage command signal Vw. In other words, the capacitor current phase specifying unit 1535 first specifies the intermediate-phase voltage command signal of which the signal level is the second highest (or the second lowest) out of the U-phase voltage command signal Vu, the V-phase voltage command signal Vv, and the W-phase voltage command signal Vw. In other words, the capacitor current phase specifying unit 1535 first specifies the intermediate-phase voltage command signal having a signal level closest to a zero level (or the average value of the signal levels of the U-phase voltage command signal Vu, the V-phase voltage command signal Vv, and the W-phase voltage command signal Vw) out of the U-phase voltage command signal Vu, the V-phase voltage command signal Vv, and the W-phase voltage command signal Vw.

Thereafter, the capacitor current phase specifying unit 1535 specifies that the phase of the phase voltage command signal which is not the intermediate-phase voltage command signal and in which the absolute value of the difference from the signal level of the intermediate-phase voltage command signal is greater out of the U-phase voltage command signal Vu, the V-phase voltage command signal Vv, and the W-phase voltage command signal Vw is the capacitor current phase. In other words, the capacitor current phase specifying unit 1535 specifies that the phase of the phase voltage command signal which is farthest from the intermediate-phase voltage command signal out of the U-phase voltage command signal Vu, the V-phase voltage command signal Vv, and the W-phase voltage command signal Vw is the capacitor current phase.

Figures 9A, 9B:
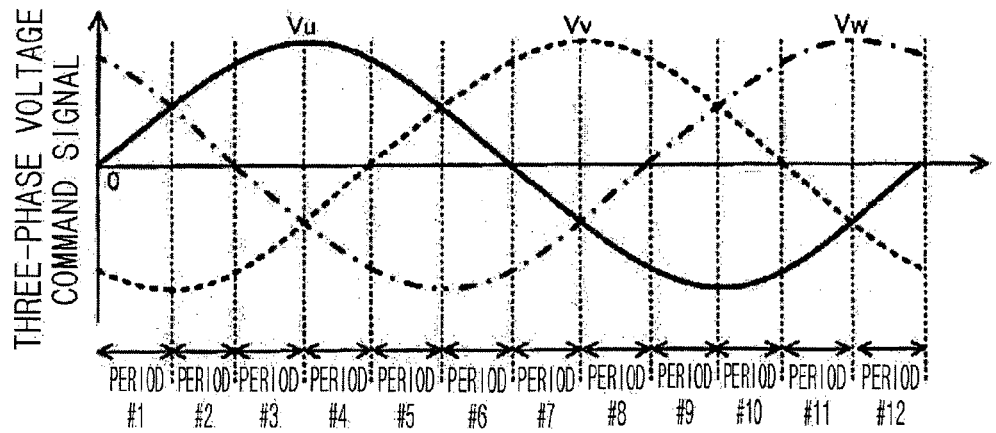
FIG. 9A is a graph illustrating a magnitude relation of three-phase voltage command signals (that is, a U-phase voltage command signal, a V-phase voltage command signal, and a W-phase voltage command signal)
FIG. 9B is a graph illustrating a relationship between three-phase voltage command signals (that is, a U-phase voltage command signal, a V-phase voltage command signal, and a W-phase voltage command signal) and a capacitor current phase.

The operation of specifying the capacitor current phase based on the magnitude relation of the three-phase voltage command signals (that is, the U-phase voltage command signal Vu, the V-phase voltage command signal Vv, and the W-phase voltage command signal Vw) will be described below with reference to FIGS. 9A and 9B. FIGS. 9A and 9B are a graph and a table illustrating a relationship between the magnitude relation of the three-phase voltage command signals (that is, the U-phase voltage command signal Vu, the V-phase voltage command signal Vv, and the W-phase voltage command signal Vw) and the capacitor current phase.

In the three-phase voltage command signals illustrated in FIG. 9A, period #4 is noticed. In period #4, a relationship of signal level of W-phase voltage command signal Vw<signal level of V-phase voltage command signal Vv<signal level of U-phase voltage command signal Vu is established. Accordingly, in this case, the V-phase voltage command signal Vv becomes the intermediate-phase voltage command signal as illustrated in FIG. 9B. In period #4, a relationship of |signal level of U-phase voltage command signal Vu-signal level of V-phase voltage command signal Vv|>|signal level of W-phase voltage command signal Vw-signal level of V-phase voltage command signal Vv| is established. Accordingly, in this case, the U phase is specified as the capacitor current phase as illustrated in FIG. 9B.

In addition, the capacitor current phases in periods #1 to #3 and periods #5 to #12 illustrated in FIG. 9A are illustrated in FIG. 9B.

Figure 10A:
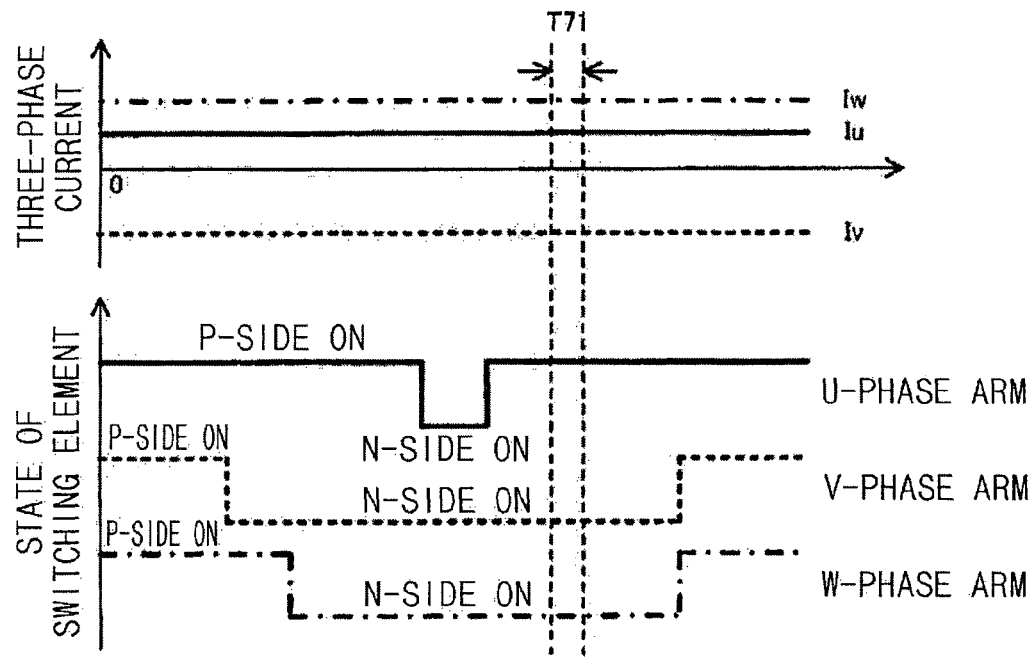
FIG. 10A is a timing chart illustrating states of switching elements of an inverter.
Figure 10B:
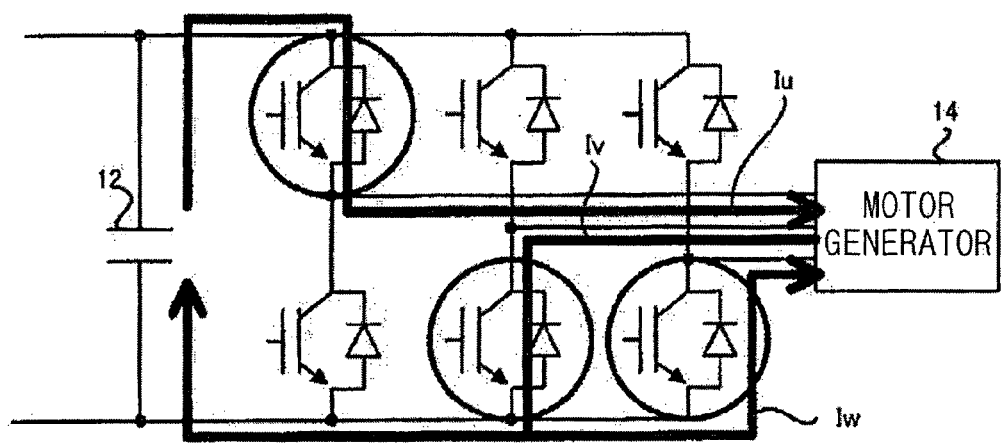
FIG. 10B is a circuit diagram illustrating states of the switching elements of the inverter.

The reason why the capacitor current phase can be specified based on the magnitude relation of the three-phase voltage command signals (that is, the U-phase voltage command signal Vu, the V-phase voltage command signal Vv, and the W-phase voltage command signal Vw) will be described below with reference to FIGS. 10A to 11. FIGS. 10A and 10B are diagrams illustrating states of the switching elements of the inverter 13. FIG. 11 is a graph illustrating a relationship between the three-phase voltage command signals and the states of the switching elements of the inverter 13.

An example in which the U-phase current Iu, the V-phase current Iv, and the W-phase current Iw illustrated in FIG. 10A flow and the states of the switching elements of the inverter 13 vary in the modes illustrated in FIG. 10A will be described below. Paying attention to period T71, the U-phase current Iu and the W-phase current Iw are positive (where the direction of a current from the inverter 13 to the motor generator 14 is defined as positive) and the V-phase current Iv is negative. In period T71, the p-side switching element Qup of the U-phase arm is in an ON state and the n-side switching element Qun of the U-phase arm is in an OFF state. Similarly, in period T71, the p-side switching element Qvp of the V-phase arm is in an OFF state and the n-side switching element Qvn of the V-phase arm is in an ON state. Similarly, in period T71, the p-side switching element Qwp of the W-phase arm is in an OFF state and the n-side switching element Qwn of the W-phase arm is in an ON state.

In this case, as illustrated in FIG. 10B, for example, a part of the V-phase current Iv flowing from the motor generator 14 to the inverter 13 is returned as the W-phase current Iw from the inverter 13 to the motor generator 14. Another part of the V-phase current Iv flowing from the motor generator 14 to the inverter 13 flows as the U-phase current Iu in the U-phase arm via the smoothing capacitor 12. That is, in period T71, the U-phase current Iu matches the capacitor current Ic itself.

Taking into consideration various situations in which the states of the switching elements of the inverter 13 are different from the states in period T71, it can be seen that the capacitor current Ic matches the phase current of the phase of the p-side switching element which is solely in the ON state out of three p-side switching elements or the phase current (here the polarity thereof is inverted) of the phase of the n-side switching element which is solely in the ON state out of three n-side switching elements. Taking it into consideration that the switching states of the three p-side switching elements and the three n-side switching elements vary every moment, the phase current matching the capacitor current Ic varies every moment. That is, the phase current of a specific phase hardly matches the capacitor current Ic for a long period of time. Accordingly, the capacitor current phase which is a phase in which the phase current mainly defining the capacitor current Ic flows is substantially a phase of a phase current in which a period in which the phase current matches the capacitor current Ic in a predetermined period is the longest.

Figure 11:
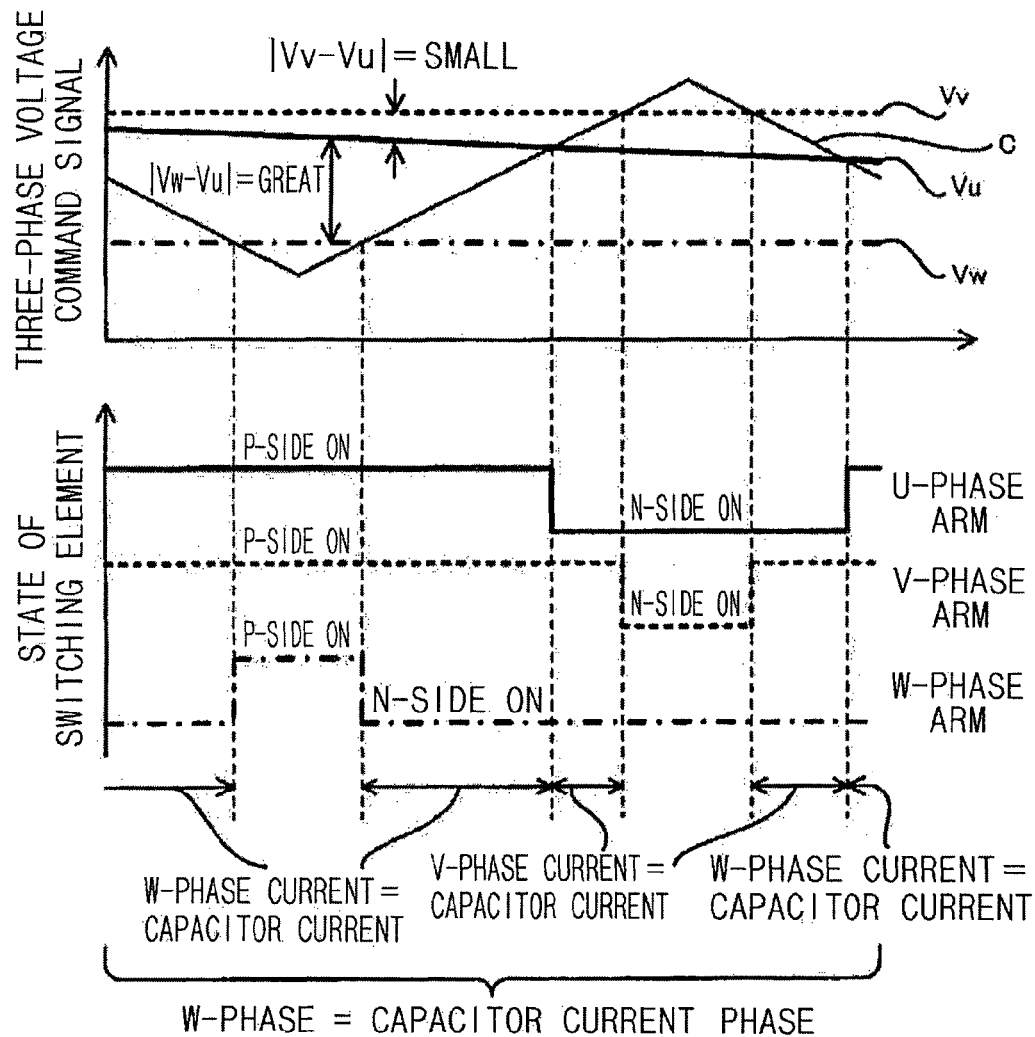
FIG. 11 is a graph illustrating a relationship between the three-phase voltage command signals and the states of the switching elements of the inverter.

Therefore, in describing the operation of specifying the phase of the phase current in which a period in which the phase current matches the capacitor current Ic is the longest, an example of three-phase voltage command signals in which a relationship of signal level of W-phase voltage command signal Vw<signal level of U-phase voltage command signal Vu<signal level of V-phase voltage command signal Vv and a relationship of signal level of V-phase voltage command signal Vv-signal level of U-phase voltage command signal Vu|<|signal level of W-phase voltage command signal Vw-signal level of U-phase voltage command signal Vu| are established is noticed as illustrated in FIG. 11. Particularly, in FIG. 11, a very short period corresponding to the carrier signal C of one cycle is noticed.

As illustrated in FIG. 11, a period in which the V-phase current Iv matches the capacitor current Ic and a period in which the W-phase current Iw matches the capacitor current Ic are present in the very short period corresponding to the carrier signal C of one cycle. That is, it can be seen that the phase current corresponding to the phase of the phase voltage command signal having the highest signal level and the phase current corresponding to the phase of the phase voltage command signal having the lowest signal level match the capacitor current Ic.

In this case, as illustrated in FIG. 11, the period in which the W-phase current Iw matches the capacitor current Ic is longer than the period in which the V-phase current Iv matches the capacitor current Ic. In other words, the period in which the W-phase current Iw matches the capacitor current Ic is the longest. That is, it can be seen that the period in which the phase current corresponding to the phase of the phase voltage command signal (the W-phase voltage command signal Vw in the example illustrated in FIG. 11) in which the absolute value of the difference from the signal level of the intermediate-phase voltage command signal (the U-phase voltage command signal Vu in the example illustrated in FIG. 11) is greater matches the capacitor current Ic is the longest.

In this way, the capacitor current phase specifying unit 1535 can specify the capacitor current phase based on the magnitude relation of three-phase voltage command signals (that is, the U-phase voltage command signal Vu, the V-phase voltage command signal Vv, and the W-phase voltage command signal Vw).

Referring to FIG. 6 again, after the capacitor current phase specifying unit 1535 specifies the capacitor current phase, the correction value for correcting the detection signal of the V-phase current sensor 14v or the W-phase current sensor 14w for detecting the phase current of the capacitor current phase is calculated.

Specifically, when the V phase is specified as the capacitor current phase, the V-phase correction value calculating unit 1536v calculates the variation of the inter-terminal voltage detection signal VH* input to the V-phase correction value calculating unit 1536v in the period in which the V phase is specified as the capacitor current phase (step S322). For example, the V-phase correction value calculating unit 1536v may calculate a difference between the inter-terminal voltage detection signal VH* at the start point of the period in which the V phase is specified as the capacitor current phase and the inter-terminal voltage detection signal VH* at the end point of the period in which the V phase is specified as the capacitor current phase as the variation of the inter-terminal voltage detection signal VH*.

Similarly, when the W phase is specified as the capacitor current phase, the W-phase correction value calculating unit 1536w calculates the variation of the inter-terminal voltage detection signal VH* input to the W-phase correction value calculating unit 1536w in the period in which the W phase is specified as the capacitor current phase (step S322). For example, the W-phase correction value calculating unit 1536w may calculate a difference between the inter-terminal voltage detection signal VH* at the start point of the period in which the W phase is specified as the capacitor current phase and the inter-terminal voltage detection signal VH* at the end point of the period in which the W phase is specified as the capacitor current phase as the variation of the inter-terminal voltage detection signal VH*.

Thereafter, the V-phase correction value calculating unit 1536v calculates the V-phase correction value Cv3 for correcting the V-phase current detection signal Iv* such that the variation of the inter-terminal voltage detection signal VH* (that is, the variation of the inter-terminal voltage detection signal VH* in the period in which the V phase is specified as the capacitor current phase) calculated in step S322 is zero (step S323). At this time, the V-phase correction value calculating unit 1536v may calculate the V-phase correction value Cv3, for example, by performing PI control based on the variation of the inter-terminal voltage detection signal VH* (or the inter-terminal voltage detection signal VH* itself).

The polarity of the calculated V-phase correction value Cv3 may be the polarity corresponding to the polarity of the V-phase current Iv in the period in which the V phase is specified as the capacitor current phase and the variation tendency of the inter-terminal voltage detection signal VH*.

For example, as illustrated in FIG. 8A, when a positive error (that is, error causing a state in which the V-phase current detection signal Iv* greater than the actual V-phase current Iv is detected) αv is included in the V-phase current detection signal Iv*, the inter-terminal voltage VH (the inter-terminal voltage detection signal VH*) increases in a state in which the polarity of the V-phase current is positive, and the inter-terminal voltage VH (the inter-terminal voltage detection signal VH*) decreases in a state in which the polarity of the V-phase current is negative. In this case, the negative V-phase correction value Cv3 which can be added to the V-phase current detection signal Iv* to decrease the V-phase current detection signal Iv* is calculated to correct the positive error αv included in the V-phase current detection signal Iv*. That is, when the polarity of the V-phase current Iv is positive and the inter-terminal voltage detection signal VH* increases or when the polarity of the V-phase current Iv is negative and the inter-terminal voltage detection signal VH* decreases, the negative V-phase correction value Cv3 is calculated.

On the other hand, when a negative error (that is, error causing a state in which the V-phase current detection signal Iv* smaller than the actual V-phase current Iv is detected) αv is included in the V-phase current detection signal Iv*, the inter-terminal voltage VH (the inter-terminal voltage detection signal VH*) decreases in a state in which the polarity of the V-phase current is positive, and the inter-terminal voltage VH (the inter-terminal voltage detection signal VH*) increases in a state in which the polarity of the V-phase current is negative. In this case, the positive V-phase correction value Cv3 which can be added to the V-phase current detection signal Iv* to increase the V-phase current detection signal Iv* is calculated to correct the negative error αv included in the V-phase current detection signal Iv*. That is, when the polarity of the V-phase current Iv is positive and the inter-terminal voltage detection signal VH* decreases or when the polarity of the V-phase current Iv is negative and the inter-terminal voltage detection signal VH* increases, the positive V-phase correction value Cv3 is calculated.

The calculated V-phase correction value Cv3 may have, for example, a magnitude corresponding to the variation of the inter-terminal voltage detection signal VH* in the period in which the V phase is specified as the capacitor current phase. For example, as the variation of the inter-terminal voltage detection signal VH* in the period in which the V phase is specified as the capacitor current phase becomes greater, the V-phase correction value Cv3 may become greater. In other words, as the variation of the inter-terminal voltage detection signal VH* in the period in which the V-phase is specified as the capacitor current phase becomes smaller, the V-phase correction value Cv3 may become smaller.

Similarly, the W-phase correction value calculating unit 1536w calculates the W-phase correction value Cw3 for correcting the W-phase current detection signal Iw* such that the variation of the inter-terminal voltage detection signal VH* calculated in step S322 in the period in which the W phase is specified as the capacitor current phase is zero (step S323). At this time, the W-phase correction value calculating unit 1536w may calculate the W-phase correction value Cw3, for example, by performing PI control based on the variation of the inter-terminal voltage detection signal VH* (or the inter-terminal voltage detection signal VH* itself).

The polarity of the calculated W-phase correction value Cw3 may be the polarity corresponding to the polarity of the W-phase current Iw in the period in which the W phase is specified as the capacitor current phase and the variation tendency of the inter-terminal voltage detection signal VH*. Details thereof are the same as the polarity of the V-phase correction value Cv3. The calculated W-phase correction value Cw3 may have, for example, a magnitude corresponding to the variation of the inter-terminal voltage detection signal VH* in the period in which the W phase is specified as the capacitor current phase. Details thereof are the same as the magnitude of the V-phase correction value Cv3.

Figure 12A:
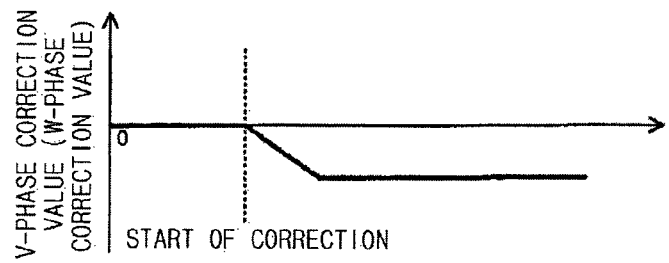
FIG. 12A is a graph illustrating an example of a change of a V-phase correction value (W-phase correction value) when a V-phase current detection signal (W-phase current detection signal) is corrected.
Figure 12B:
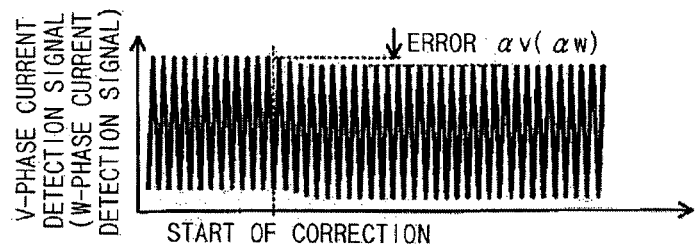
FIG. 12B is a graph illustrating an example of a change of a V-phase current detection signal (W-phase current detection signal) when the V-phase current detection signal (W-phase current detection signal) is corrected.
Figure 12C:
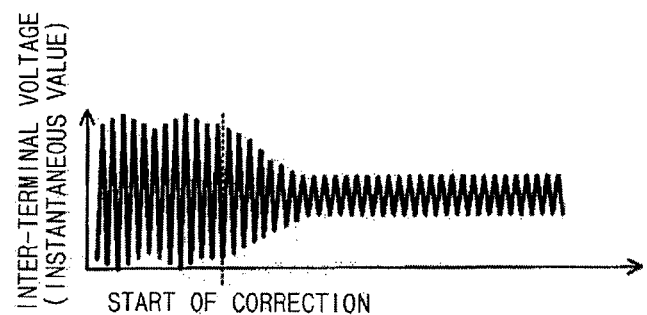
FIG. 12C is a graph illustrating an example of a change of an inter-terminal voltage (instantaneous value) when the V-phase current detection signal (W-phase current detection signal) is corrected.
Figure 12D:
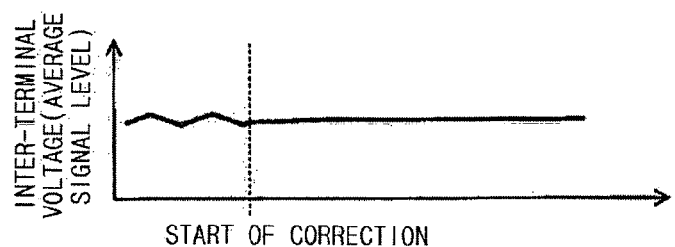
FIG. 12D is a graph illustrating an example of a change of the inter-terminal voltage (average signal level) when the V-phase current detection signal (W-phase current detection signal) is corrected.

Thereafter, the V-phase adder 158v adds the V-phase correction value Cv3 (see FIG. 12A), which is calculated by the V-phase correction value calculating unit 1536v in step S323, to the V-phase current detection signal Iv* (step S324). The V-phase adder 158v continuously adds the V-phase correction value Cv3, which is calculated in the period in which the V phase is specified as the capacitor current phase, to the V-phase current detection signal Iv* even in the period in which the V phase is not specified as the capacitor current phase. Accordingly, as illustrated in FIG. 12B, the error αv included in the V-phase current detection signal Iv* is corrected. As a result, as illustrated in FIGS. 12C and 12D, the variation of the inter-terminal voltage VH of the smoothing capacitor 12 is substantially zero. In other words, the inter-terminal voltage VH of the smoothing capacitor 12 substantially matches the target voltage value.

Similarly, the W-phase adder 158w adds the W-phase correction value Cw3 (see FIG. 12A), which is calculated by the W-phase correction value calculating unit 1536w in step S323, to the W-phase current detection signal Iw* (step S324). The W-phase adder 158w continuously adds the W-phase correction value Cw3, which is calculated in the period in which the W phase is specified as the capacitor current phase, to the W-phase current detection signal Iw* even in the period in which the W phase is not specified as the capacitor current phase. Accordingly, as illustrated in FIG. 12B, the error αw included in the W-phase current detection signal Iw* is corrected. As a result, as illustrated in FIGS. 12C and 12D, the variation of the inter-terminal voltage VH of the smoothing capacitor 12 is substantially zero. In other words, the inter-terminal voltage VH of the smoothing capacitor 12 substantially matches the target voltage value.

According to the above-mentioned PWM control operation, the PWM control unit 153 can suitably correct the V-phase current detection signal Iv* which is the detection signal of the V-phase current sensor 14v. That is, the PWM control unit 153 can suitably correct the error αv included in the V-phase current detection signal Iv*. Similarly, the PWM control unit 153 can suitably correct the W-phase current detection signal Iw* which is the detection signal of the W-phase current sensor 14w. That is, the PWM control unit 153 can suitably correct the error αw included in the W-phase current detection signal Iw*.

Particularly, in this embodiment, the PWM control unit 153 specifies the capacitor current phase and thus can individually correct the detection signals of the current sensors so as to individually correct the errors included in the detection signals of the current sensors even when the vehicle 1 includes plural current sensors (that is, the V-phase current sensor 14v and the W-phase current sensor 14w). That is, the PWM control unit 153 can individually correct the error αv included in the V-phase current detection signal Iv* without affecting the W-phase current detection signal Iw* almost or at all. Similarly, the PWM control unit 153 can individually correct the error αw included in the W-phase current detection signal Iw* without affecting the V-phase current detection signal Iv* almost or at all.

Furthermore, in this embodiment, the PWM control unit 153 can suitably correct the error αv included in the V-phase current detection signal Iv* and the error αw included in the W-phase current detection signal Iw* while the PWM control unit 153 generates three-phase voltage command signals and the like.

Figure 13:
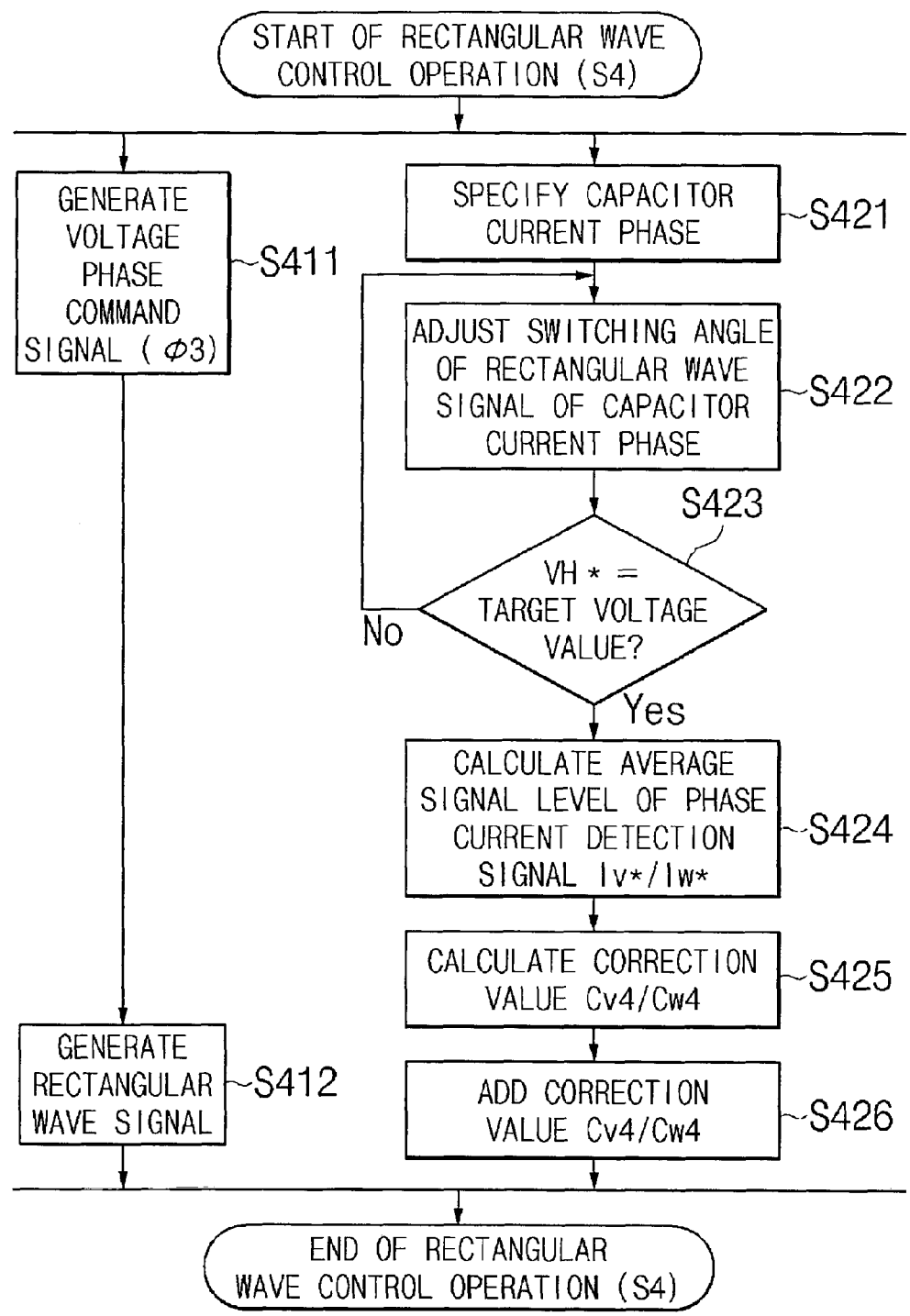
FIG. 13 is a flowchart illustrating the flow of an inverter control operation (rectangular wave control operation) which is performed by the rectangular wave control unit.

Subsequently, the flow of the inverter control operation (rectangular wave control operation) which is performed by the rectangular wave control unit 154 will be described with reference to FIG. 13. FIG. 13 is a flowchart illustrating the flow of the inverter control operation (rectangular wave control operation) which is performed by the rectangular wave control unit 154.

As illustrated in FIG. 13, the phase converting unit 1542 generates a voltage phase command signal φ3 (step S411). The method of generating the voltage phase command signal φ3 is the same as described above with reference to FIG. 4.

Thereafter, the rectangular wave generating unit 1543 generates the U-phase rectangular wave signals Pup and Pun, the V-phase rectangular wave signals Pvp and Pvn, and the W-phase rectangular wave signals Pwp and Pwn in response to the voltage phase command signal φ3 (step S412). As a result, the inverter 13 operates based on the rectangular wave signals.

In parallel to the operations of steps S411 and S412, the rectangular wave control unit 154 corrects an error αv included in the V-phase current detection signal Iv* which is the detection signal of the V-phase current sensor 14v (steps S421 to S426). The rectangular wave control unit 154 corrects an error αw included in the W-phase current detection signal Iw* which is the detection signal of the W-phase current sensor 14w (steps S421 to S426).

Particularly, in this embodiment, the rectangular wave control unit 154 corrects the error αv and the error αw in a way different from the way in which the PWM control unit 153 corrects the error αv and the error αw. That is, the rectangular wave control unit 154 corrects the error αv and the error αw in a mode other than the PWM control operation. The reason is that the rectangular wave control unit 154 may not correct the error αv and the error αw in the same mode as the PWM control operation when the inverter 13 is controlled in the rectangular wave control mode. That is, when the inverter 13 is controlled in the rectangular wave control mode, the rectangular wave control unit 154 may not correct the error αv by only calculating the V-phase correction value Cv3 such that the variation of the inter-terminal voltage detection signal VH* in the period in which the V phase is specified as the capacitor current phase is zero. Similarly, when the inverter 13 is controlled in the rectangular wave control mode, the rectangular wave control unit 154 may not correct the error αw by only calculating the W-phase correction value Cw3 such that the variation of the inter-terminal voltage detection signal VH* in the period in which the W phase is specified as the capacitor current phase is zero.

Figure 14A:
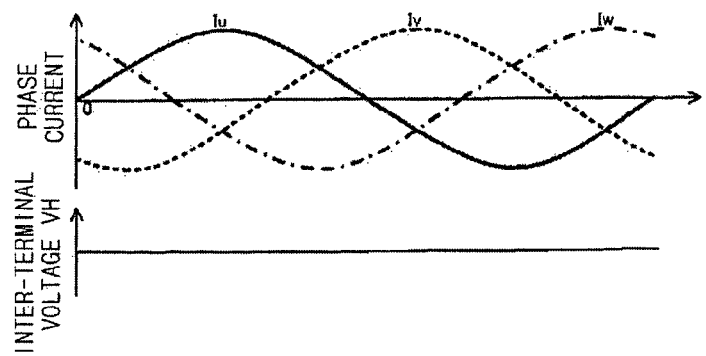
FIG. 14A is a graph illustrating a relationship between three-phase currents (that is, a U-phase current, a V-phase current, and a W-phase current) and an inter-terminal voltage when an error is not included in a V-phase current detection signal.
Figure 14B:
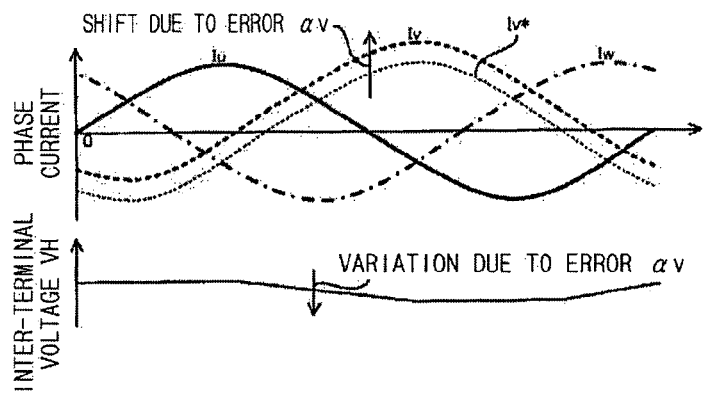
FIG. 14B is a graph illustrating a relationship between the three-phase currents and the inter-terminal voltage when an error is included in the V-phase current detection signal.
Figure 14C:
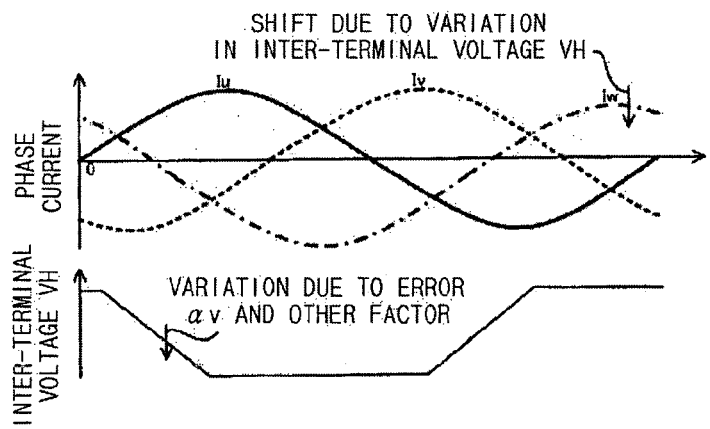
FIG. 14C is a graph illustrating a relationship between the three-phase currents and the inter-terminal voltage when the inter-terminal voltage varies due to both an error included in the V-phase current detection signal and a factor other than the error included in the V-phase current detection signal.

The reason why the error αv and the error αw may not be corrected in the same mode as the PWM control operation when the inverter 13 is controlled in the rectangular wave control mode will be described below with reference to FIGS. 14A to 14C. FIGS. 14A to 14C are graphs illustrating a relationship between the three-phase currents (that is, a U-phase current Iu, a V-phase current Iv, and a W-phase current Iw) and the inter-terminal voltage VH when the error αv is not included in the V-phase current detection signal Iv*, a relationship between the three-phase currents and the inter-terminal voltage VH when the error αv is included in the V-phase current detection signal Iv*, and a relationship between the three-phase currents and the inter-terminal voltage VH when the inter-terminal voltage VH varies due to both the error αv included in the V-phase current detection signal Iv* and a factor other than the error αv included in the V-phase current detection signal Iv*. In the examples illustrated in FIGS. 14A to 14C, it is assumed for the purpose of simplification of description that the error αw is not included in the W-phase current detection signal Iw*.

FIG. 14A illustrates the three-phase currents when the error αv is not included in the V-phase current detection signal Iv*. In this case, even when the inverter 13 is controlled in the rectangular wave control mode as illustrated in FIG. 14A, the signal waveform of the V-phase current Iv is not shifted in the plus direction or the minus direction from the signal waveforms of the U-phase current Iu and the W-phase current Iw, similarly to when the inverter 13 is controlled in the PWM control mode. Accordingly, even when the inverter 13 is controlled in the rectangular wave control mode, the inter-terminal voltage VH does not vary easily (see FIG. 8B), similarly to when the inverter 13 is controlled in the PWM control mode. That is, when the error αv is not included in the V-phase current detection signal Iv* and the inverter 13 is controlled in the rectangular wave control mode, the inter-terminal voltage VH easily matches the target voltage value, similarly to when the inverter 13 is controlled in the PWM control mode.

On the other hand, FIG. 14B illustrates the three-phase currents when the error αv is included in the V-phase current detection signal Iv*. Particularly, FIG. 14B illustrates the three-phase currents when the inter-terminal voltage VH does not vary due to a factor other than the error αv included in the V-phase current detection signal Iv*. That is, FIG. 14B illustrates the three-phase currents when the variation of the inter-terminal voltage VH is mainly caused by the error αv. In this case, even when the inverter 13 is controlled in the rectangular wave control mode, the signal waveform of the V-phase current Iv is shifted in the plus direction or the minus direction from the signal waveforms of the U-phase current Iu and the W-phase current Iw, similarly to when the inverter 13 is controlled in the PWM control mode. As a result, even when the inverter 13 is controlled in the rectangular wave control mode, the inter-terminal voltage VH varies (see FIG. 8A), similarly to when the inverter 13 is controlled in the PWM control mode. That is, when the error αv is not included in the V-phase current detection signal Iv* and the inverter 13 is controlled in the rectangular wave control mode, the inter-terminal voltage VH does not match the target voltage value, similarly to when the inverter 13 is controlled in the PWM control mode.

On the other hand, FIG. 14C illustrates the three-phase currents when the inter-terminal voltage VH varies due to both the error αv included in the V-phase current detection signal Iv* and a factor other than the error αv included in the V-phase current detection signal Iv*. That is, FIG. 14C illustrates the three-phase currents when the variation of the inter-terminal voltage VH is caused by the factor other than the error αv as well as the error αv. In this case, the error αv causes the shift of the V-phase current Iv (that is, separation from an originally-desired current value (target current value)) as described above. The variation of the inter-terminal voltage VH due to a factor other than the error αv may also cause the shift of at least one of the U-phase current Iu, the V-phase current Iv, and the W-phase current Iw. For example, the variation of the inter-terminal voltage VH due to a factor other than the error αv may cause the shift of at least one of the U-phase current Iu, the V-phase current Iv, and the W-phase current Iw in synchronization with the variation cycle of the inter-terminal voltage VH. As a result, since the error αw is not included as illustrated in FIG. 14C, the W-phase current Iw not shifted due to the error αw may be shifted by the variation of the inter-terminal voltage VH due to a factor other than the error αv. In addition, the V-phase current Iv shifted due to the error αv may match an originally-desired current value (target current value) by the variation of the inter-terminal voltage VH due to a factor other than the error αv.

When the states of the three-phase currents are the same as illustrated in FIGS. 14A and 14B, the rectangular wave control unit 154 can correct the error αv and the error αw in the same mode as the PWM control operation. Even when the states of the three-phase currents are the same as illustrated in FIGS. 14A and 14B, the PWM control unit 153 can correct the error αv and the error αw by performing the above-mentioned PWM control operation.

However, when the states of the three-phase currents are the same as illustrated in FIG. 14C, the rectangular wave control unit 154 may not correct the error αv and the error αw in the same mode as the PWM control operation. On the other hand, even when the states of the three-phase currents are the same as illustrated in FIG. 14C, the PWM control unit 153 can correct the error αv and the error αw by performing the above-mentioned PWM control operation.

Specifically, the shift of the three-phase currents due to the variation of the inter-terminal voltage VH due to a factor other than the error αv is also reflected in the V-phase current detection signal Iv* and the W-phase current detection signal Iw*. Accordingly, the PWM control unit 153 can generate a PWM signal based on the V-phase current detection signal Iv* and the W-phase current detection signal Iw* in which the shift of the three-phase currents due to the variation of the inter-terminal voltage VH due to a factor other than the error αv is reflected. That is, the PWM control unit 153 can generate a PWM signal with an adjusted duty ratio based on the three-phase current which is shifted due to the variation of the inter-terminal voltage VH due to a factor other than the error αv. As a result, the PWM control unit 153 can control the inverter 13 so as to cancel the variation of the inter-terminal voltage VH due to a factor other than the error αv by adjusting the duty ratio of the PWM signal. When the variation of the inter-terminal voltage VH due to a factor other than the error αv is cancelled, the shift of the three-phase currents due to the variation of the inter-terminal voltage VH due to a factor other than the error αv is also cancelled. As a result, even when the inter-terminal voltage VH varies due to both the error αv and a factor other than the error αv, the states of the three-phase currents transition to states in which the U-phase current Iu and the W-phase current Iw are not shifted and the V-phase current Iv is shifted due to the error αv. That is, the states of the three-phase currents transition from the states illustrated in FIG. 14C to the states illustrated in FIG. 14B. As a result, even when the inter-terminal voltage VH varies due to both the error αv and a factor other than the error αv, the PWM control unit 153 can correct the error αv and the error αw by performing the above-mentioned PWM control operation.

On the other hand, the rectangular wave control unit 154 generates rectangular wave signals of which the duty ratio cannot be adjusted. Accordingly, the rectangular wave control unit 154 cannot control the inverter 13 so as to cancel the variation of the inter-terminal voltage VH due to a factor other than the error αv. As a result, the shift of the three-phase currents due to the variation of the inter-terminal voltage VH due to a factor other than the error αv is not cancelled. Therefore, when the inverter 13 is controlled in the rectangular wave control mode, the states of the three-phase currents are maintained in the states illustrated in FIG. 14C. As a result, in some cases, the W-phase current Iw which is not shifted due to the error αw because the error αw is not included may be shifted due to the variation of the inter-terminal voltage VH due to a factor other than the error αv. In some cases, the V-phase current Iv shifted due to the error αv may match the originally-desired current value (target current value) due to the variation of the inter-terminal voltage VH due to a factor other than the error αv.

In this state, it is assumed that the rectangular wave control unit 154 corrects the error αv and the error αw in the same mode as the PWM control operation. In this case, the rectangular wave control unit 154 may recognize that the W-phase current Iw is shifted. Accordingly, the rectangular wave control unit 154 calculates the W-phase correction value Cw3 for correcting the W-phase current detection signal Iw* of the current sensor 14w which detects the W-phase current Iw. The adder 158w adds the W-phase correction value Cw3 to the W-phase current detection signal Iw*. As a result, the W-phase current detection signal Iw* which matches the W-phase current Iw because the error αw is not included may not match the W-phase current Iw by adding the W-phase correction value Cw3. On the other hand, the rectangular wave control unit 154 may recognize that the V-phase current Iv is not shifted. Accordingly, the V-phase current detection signal Iv* which does not match the V-phase current Iv because the error αv is not included is maintained in the state in which it does not match the V-phase current Iv, because the V-phase correction value Cv3 is not added thereto. As a result, the rectangular wave control unit 154 cannot correct the error αv and may erroneously correct the W-phase current detection signal Iw* not including the error αw.

In this way, the rectangular wave control unit 154 may correct the error αv and the error αw in the same mode as the PWM control operation. Accordingly, in this embodiment, the rectangular wave control unit 154 corrects the error αv and the error αw in a mode different from the PWM control operation.

Therefore, a countermeasure for correcting the error αv and the error αw in a mode different from the PWM control operation will be described below. In the inter-terminal voltage VH (inter-terminal voltage detection signal VH*) matches the target voltage value, the shift of the three-phase currents does not occur (see FIG. 14A). That is, in the state in which the inter-terminal voltage VH matches the target voltage value, neither of the shift of the three-phase currents due to the error αv and the error αw nor the shift of the three-phase currents due to a factor other than the error αv and error αw occur. On the other hand, in the state in which the shift of the three-phase currents does not occur, the average signal levels of the three-phase currents match a zero level.

Accordingly, when the error αv is not included in the V-phase current detection signal Iv* in the state in which the inter-terminal voltage VH matches the target voltage value (that is, in a state in which the average signal level of the V-phase current Iv matches the zero level), the average signal level of the V-phase current detection signal Iv* match the zero level. In other words, when the average signal level of the V-phase current detection signal Iv* does not match the zero level in the state in which the inter-terminal voltage VH matches the target voltage value (that is, in a state in which the average signal level of the V-phase current Iv matches the zero level), it is estimated that the error αv is included in the V-phase current detection signal Iv*.

Similarly, when the error αw is not included in the W-phase current detection signal Iw* in the state in which the inter-terminal voltage VH matches the target voltage value (that is, in a state in which the average signal level of the W-phase current Iw matches the zero level), the average signal level of the W-phase current detection signal Iw* match the zero level. In other words, when the average signal level of the W-phase current detection signal Iw* does not match the zero level in the state in which the inter-terminal voltage VH matches the target voltage value (that is, in a state in which the average signal level of the W-phase current Iw matches the zero level), it is estimated that the error αw is included in the W-phase current detection signal Iw*.

Accordingly, in this embodiment, the rectangular wave control unit 154 first adjusts the inter-terminal voltage VH such that the inter-terminal voltage VH (inter-terminal voltage detection signal VH*) matches the target voltage value. That is, the rectangular wave control unit 154 changes the states of the three-phase currents to the states illustrated in FIG. 14A. Then, the rectangular wave control unit 154 estimates that the difference between the average signal level of the V-phase current detection signal Iv* and the zero level corresponds to the error αv and then calculates the V-phase correction value Cv4 corresponding to the difference. Similarly, the rectangular wave control unit 154 estimates that the difference between the average signal level of the W-phase current detection signal Iw* and the zero level corresponds to the error αw and then calculates the W-phase correction value Cw4 corresponding to the difference.

The operation of correcting the error αv and the error αw which is performed by the rectangular wave control unit 154 will be described below with reference to FIG. 13 again.

As illustrated in FIG. 13, the rectangular wave control unit 154 first adjusts the inter-terminal voltage VH such that the inter-terminal voltage VH (inter-terminal voltage detection signal VH*) matches the target voltage value (steps S421 to S423).

In order to adjust the inter-terminal voltage VH, first, the capacitor current phase specifying unit 1544 specifies the capacitor current phase (step S421). The capacitor current phase specifying unit 1544 specifies the capacitor current phase in a mode other than the mode in which the capacitor current phase specifying unit 1535 of the PWM control unit 153 specifies the capacitor current phase. Specifically, the capacitor current phase specifying unit 1544 specifies the capacitor current phase in response to the voltage phase command signal φ3. The reason is that when the inverter 13 is controlled in the rectangular wave control mode, the magnitudes (that is, amplitude) of the phase voltages are fixed and thus the capacitor current phase can be specified based on only the phase.

Figure 15A:
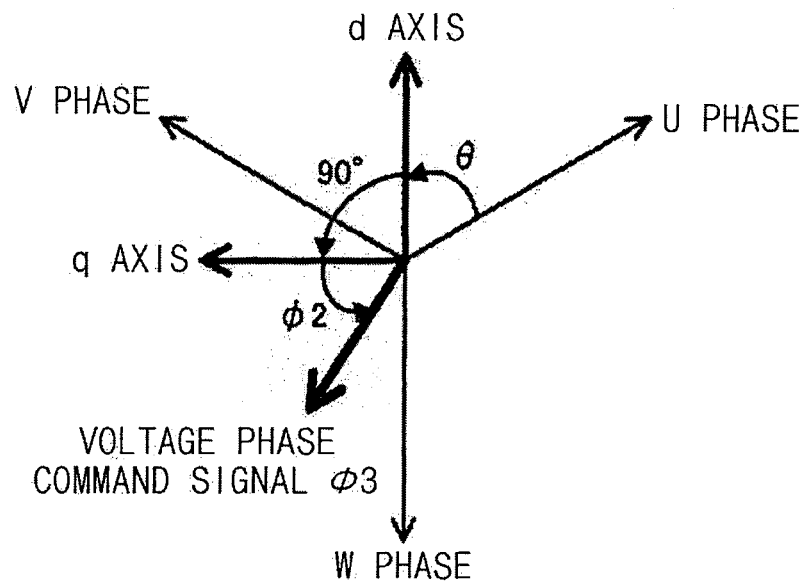
FIG. 15A is a graph illustrating a relationship between a voltage phase command signal in a d-q coordinate system and a voltage phase command signal in a three-phase fixed coordinate system.
Figure 15B:
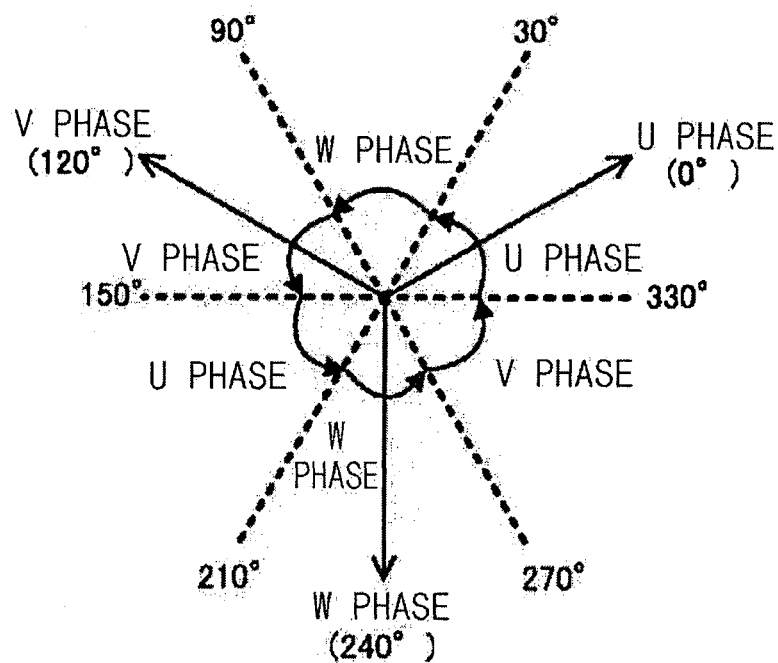
FIG. 15B is a graph illustrating a relationship between a voltage phase command signal and a capacitor current phase.

The operation of specifying the capacitor current phase in response to the voltage phase command signal φ3 will be described below with reference to FIGS. 15A to 15B. FIGS. 15A and 15B are a graph illustrating a relationship between the voltage phase command signal φ2 in the d-q coordinate system and the voltage phase command signal φ3 in the three-phase fixed coordinate system and a graph illustrating a relationship between the voltage phase command signal φ3 and the capacitor current phase, respectively.

As illustrated in FIG. 15A, the phase converting unit 1542 may convert the voltage phase command signal φ2 into the voltage phase command signal φ3 using an equation of voltage phase command signal φ3 in three-phase fixed coordinate system=voltage phase command signal φ2 in d-q coordinate system+resolver angle θ+90° as described above. Here, depending on definitions of a d axis, a q axis, a U-phase axis, a V-phase axis, and a W-phase axis, the phase converting unit 1542 may convert the voltage phase command signal φ2 into the voltage phase command signal φ3 using different equations. However, the method of converting the voltage phase command signal φ2 into the voltage phase command signal φ3 can employ known methods and thus detailed description thereof will not be made.

As illustrated in FIG. 15B, the capacitor current phase is uniquely correlated with the voltage phase command signal φ3. Accordingly, the capacitor current phase specifying unit 1544 can specify the capacitor current phase based on the voltage phase command signal φ3 by referring to certain information defining the relationship between the voltage phase command signal φ3 and the capacitor current phase. In the example illustrated in FIG. 15B, when the voltage phase command signal φ3 is equal to or greater than 0° and less than 30°, equal to or greater than 150° and less than 210°, or equal to or greater than 330° and less than 360°, the U phase is the capacitor current phase. Similarly, in the example illustrated in FIG. 15B, when the voltage phase command signal φ3 is equal to or greater than 30° and less than 90° or equal to or greater than 210° and less than 270°, the W phase is the capacitor current phase. Similarly, in the example illustrated in FIG. 15B, when the voltage phase command signal φ3 is equal to or greater than 90° and less than 150° or equal to or greater than 270° and less than 330°, the V phase is the capacitor current phase. Here, it goes without saying that the relationship between the voltage phase command signal φ3 and the capacitor current phase may vary depending on definitions of the d axis, the q axis, the U-phase axis, the V-phase axis, and the W-phase axis.

The capacitor current phase specifying unit 1544 may specify the capacitor current phase in the same mode as the capacitor current phase specifying unit 1535 of the PWM control unit 153 specifies the capacitor current phase.

Referring to FIG. 13 again, in order to adjust the inter-terminal voltage VH, the SW timing adjusting unit 1545 then adjusts the phase (that is, the switching angle of the rectangular wave signal) of at least one of the rising edge and the falling edge of the rectangular wave signal of the capacitor current phase out of the rectangular wave signals generated by the rectangular wave generating unit 1543 (step S422). The reason is that the adjustment of the switching angle of the rectangular wave signal of the capacitor current phase causes adjustment of the phase current of the capacitor current phase. The adjustment of the phase current of the capacitor current phase causes adjustment of the capacitor current Ic. The adjustment of the capacitor current Ic causes adjustment of the inter-terminal voltage VH. That is, the adjustment of the switching angle of the rectangular wave signal of the capacitor current phase more easily causes the adjustment of the inter-terminal voltage VH than the adjustment of the switching angle of the rectangular wave signal of a phase other than the capacitor current phase.

For example, when the capacitor current phase is specified to be the U phase, the SW timing adjusting unit 1545 adjusts the switching angles of the U-phase rectangular wave signal Pup and the U-phase rectangular wave signal Pun. Similarly, for example, when the capacitor current phase is specified to be the V phase, the SW timing adjusting unit 1545 adjusts the switching angles of the V-phase rectangular wave signal Pvp and the V-phase rectangular wave signal Pvn. Similarly, for example, when the capacitor current phase is specified to be the W phase, the SW timing adjusting unit 1545 adjusts the switching angles of the W-phase rectangular wave signal Pwp and the W-phase rectangular wave signal Pwn.

Particularly, the SW timing adjusting unit 1545 adjusts the switching angles of the rectangular wave signals based on the inter-terminal voltage detection signal VH* input from the voltage sensor 12V to the SW timing adjusting unit 1545.

Specifically, the SW timing adjusting unit 1545 adjusts the switching angles of the rectangular wave signals such that the variation of the inter-terminal voltage detection signal VH* is substantially zero. In other words, the SW timing adjusting unit 1545 adjusts the switching angles of the rectangular wave signals such that the inter-terminal voltage detection signal VH* matches the target voltage value.

An example of the operation of adjusting the switching angles of the rectangular wave signals based on the inter-terminal voltage detection signal VH* will be described below with reference to FIGS. 16A to 16D. FIGS. 16A to 16D are timing charts illustrating an example of the operation of adjusting the switching angles of the rectangular wave signals based on the inter-terminal voltage detection signal VH*. In FIGS. 16A to 16D, the operation of adjusting the switching angles of the rectangular wave signals (that is, the U-phase rectangular wave signals Pup and Pun) when the capacitor current phase is the U phase is exemplified. Here, the same is true when the capacitor current phase is the V phase or the W phase.

Figure 16A:
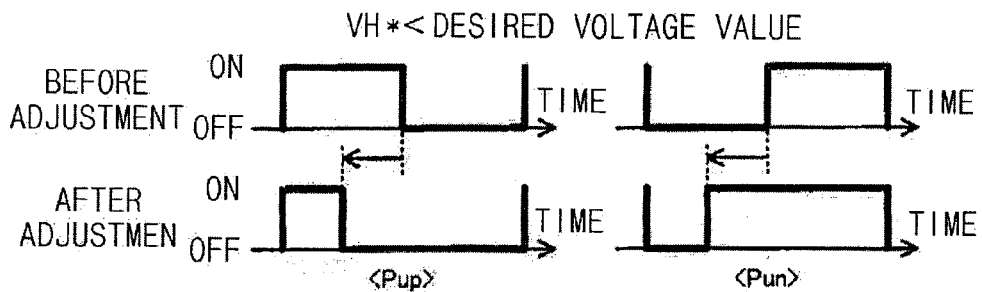
FIG. 16A is a timing chart illustrating operations of adjusting a phase at a falling edge of a U-phase rectangular wave signal Pup and a phase at a rising edge of a U-phase rectangular wave signal Pun based on an inter-terminal voltage detection signal (VH*<desired voltage value)
Figure 16B:
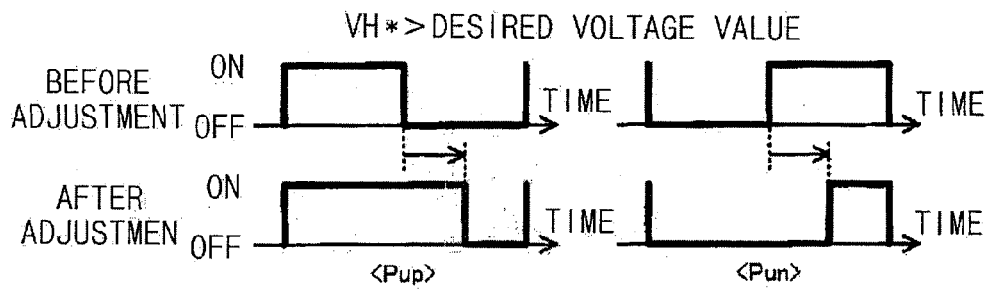
FIG. 16B is a timing chart illustrating operations of adjusting the phase at the falling edge of the U-phase rectangular wave signal Pup and the phase at the rising edge of the U-phase rectangular wave signal Pun based on the inter-terminal voltage detection signal (VH*>desired voltage value)

FIGS. 16A and 16B illustrate the operation of adjusting the phase of the falling edge of the U-phase rectangular wave signal Pup (that is, the rectangular wave signal for controlling the switching element Qup corresponding to the upper arm) and the phase of the rising edge of the U-phase rectangular wave signal Pun (that is, the rectangular wave signal for controlling the switching element Qun corresponding to the lower arm). For the purpose of convenience of explanation, the phase of the falling edge is referred to as a first switching angle and the phase of the rising edge is referred to as a second switching angle.

As illustrated in FIG. 16A, when the inter-terminal voltage detection signal VH* is smaller than the target voltage value, the SW timing adjusting unit 1545 adjusts the first switching angle of the U-phase rectangular wave signal Pup and the second switching angle of the U-phase rectangular wave signal Pun so as to increase the inter-terminal voltage detection signal VH* in comparison with that before the adjustment. In order to increase the inter-terminal voltage detection signal VH*, the capacitor current Ic can be decreased (that is, the power consumption in the motor generator 14 can be decreased). In order to decrease the capacitor current Ic, the period in which the switching element Qup corresponding to the upper arm is in the ON state can be shortened. In other words, in order to decrease the capacitor current Ic, the period in which the switching element Qun corresponding to the lower arm is in the OFF state can be shortened.

Therefore, the SW timing adjusting unit 1545 adjusts the first switching angle of the U-phase rectangular wave signal Pup such that the first switching angle of the U-phase rectangular wave signal Pup leads in comparison with that before the adjustment. That is, the SW timing adjusting unit 1545 adjusts the first switching angle of the U-phase rectangular wave signal Pup such that the timing at which the switching element Qup corresponding to the upper arm is switched to the OFF state leads in comparison with that before the adjustment. At this time, the SW timing adjusting unit 1545 preferably adjusts the first switching angle of the U-phase rectangular wave signal Pup such that the first switching angle of the U-phase rectangular wave signal Pup leads by the shift amount corresponding to the difference between the inter-terminal voltage detection signal VH* and the target voltage value.

Similarly, the SW timing adjusting unit 1545 adjusts the second switching angle of the U-phase rectangular wave signal Pun such that the second switching angle of the U-phase rectangular wave signal Pun leads in comparison with that before the adjustment. That is, the SW timing adjusting unit 1545 adjusts the second switching angle of the U-phase rectangular wave signal Pun such that the timing at which the switching element Qun corresponding to the lower arm is switched to the OFF state leads in comparison with that before the adjustment. At this time, the SW timing adjusting unit 1545 preferably adjusts the second switching angle of the U-phase rectangular wave signal Pun such that the second switching angle of the U-phase rectangular wave signal Pun leads by the shift amount corresponding to the difference between the inter-terminal voltage detection signal VH* and the target voltage value.

As illustrated in FIG. 16B, when the inter-terminal voltage detection signal VH* is greater than the target voltage value, the SW timing adjusting unit 1545 adjusts the first switching angle of the U-phase rectangular wave signal Pup and the second switching angle of the U-phase rectangular wave signal Pun so as to decrease the inter-terminal voltage detection signal VH* in comparison with that before the adjustment. In order to decrease the inter-terminal voltage detection signal VH*, the capacitor current Ic can be increased (that is, the power consumption in the motor generator 14 can be increased). In order to increase the capacitor current Ic, the period in which the switching element Qup corresponding to the upper arm is in the ON state can be extended. In other words, in order to increase the capacitor current Ic, the period in which the switching element Qun corresponding to the lower arm is in the OFF state can be extended.

Therefore, the SW timing adjusting unit 1545 adjusts the first switching angle of the U-phase rectangular wave signal Pup such that the first switching angle of the U-phase rectangular wave signal Pup lags in comparison with that before the adjustment. That is, the SW timing adjusting unit 1545 adjusts the first switching angle of the U-phase rectangular wave signal Pup such that the timing at which the switching element Qup corresponding to the upper arm is switched to the OFF state lags in comparison with that before the adjustment. At this time, the SW timing adjusting unit 1545 preferably adjusts the first switching angle of the U-phase rectangular wave signal Pup such that the first switching angle of the U-phase rectangular wave signal Pup lags by the shift amount corresponding to the difference between the inter-terminal voltage detection signal VH* and the target voltage value.

Similarly, the SW timing adjusting unit 1545 adjusts the second switching angle of the U-phase rectangular wave signal Pun such that the second switching angle of the U-phase rectangular wave signal Pun lags in comparison with that before the adjustment. That is, the SW timing adjusting unit 1545 adjusts the second switching angle of the U-phase rectangular wave signal Pun such that the timing at which the switching element Qun corresponding to the lower arm is switched to the ON state lags in comparison with that before the adjustment. At this time, the SW timing adjusting unit 1545 preferably adjusts the second switching angle of the U-phase rectangular wave signal Pun such that the second switching angle of the U-phase rectangular wave signal Pun lags by the shift amount corresponding to the difference between the inter-terminal voltage detection signal VH* and the target voltage value.

Figure 16C:
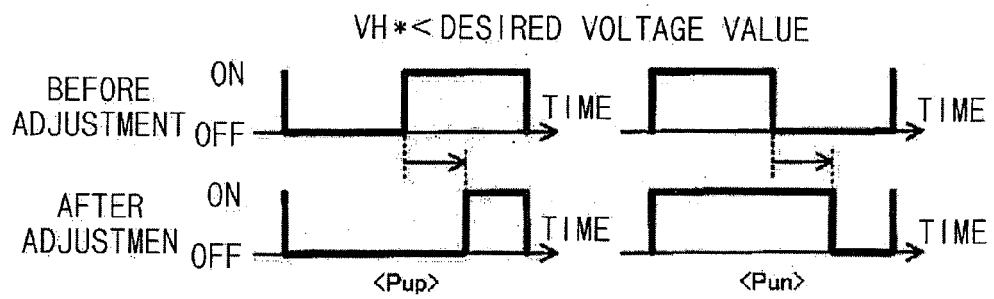
FIG. 16C is a timing chart illustrating operations of adjusting the phase at the rising edge of the U-phase rectangular wave signal Pup and the phase at the falling edge of the U-phase rectangular wave signal Pun based on an inter-terminal voltage detection signal (VH*<desired voltage value)
Figure 16D:
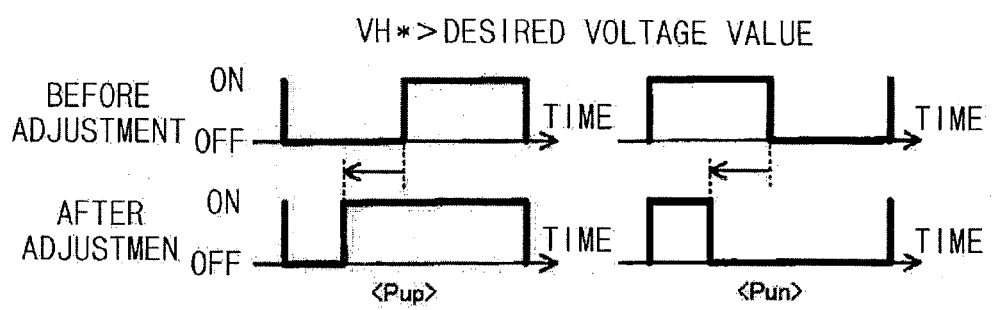
FIG. 16D is a timing chart illustrating operations of adjusting the phase at the rising edge of the U-phase rectangular wave signal Pup and the phase at the falling edge of the U-phase rectangular wave signal Pun based on an inter-terminal voltage detection signal (VH*>desired voltage value)

FIGS. 16C and 16D illustrate the operation of adjusting the phase of the rising edge of the U-phase rectangular wave signal Pup and the phase of the falling edge of the U-phase rectangular wave signal Pun. That is, FIGS. 16C and 16D illustrate the operation of adjusting the second switching angle of the U-phase rectangular wave signal Pup and the first switching angle of the U-phase rectangular wave signal Pun.

As illustrated in FIG. 16C, when the inter-terminal voltage detection signal VH* is smaller than the target voltage value, the SW timing adjusting unit 1545 adjusts the second switching angle of the U-phase rectangular wave signal Pup and the first switching angle of the U-phase rectangular wave signal Pun so as to increase the inter-terminal voltage detection signal VH* in comparison with that before the adjustment. In order to increase the inter-terminal voltage detection signal VH*, the period in which the switching element Qup corresponding to the upper arm is in the ON state and the period in which the switching element Qun corresponding to the lower arm is in the OFF state can be shortened.

Therefore, the SW timing adjusting unit 1545 adjusts the second switching angle of the U-phase rectangular wave signal Pup such that the second switching angle of the U-phase rectangular wave signal Pup lags in comparison with that before the adjustment. That is, the SW timing adjusting unit 1545 adjusts the second switching angle of the U-phase rectangular wave signal Pup such that the timing at which the switching element Qup corresponding to the upper arm is switched to the ON state lags in comparison with that before the adjustment. At this time, the SW timing adjusting unit 1545 preferably adjusts the second switching angle of the U-phase rectangular wave signal Pup such that the second switching angle of the U-phase rectangular wave signal Pup lags by the shift amount corresponding to the difference between the inter-terminal voltage detection signal VH* and the target voltage value.

Similarly, the SW timing adjusting unit 1545 adjusts the first switching angle of the U-phase rectangular wave signal Pun such that the first switching angle of the U-phase rectangular wave signal Pun lags in comparison with that before the adjustment. That is, the SW timing adjusting unit 1545 adjusts the first switching angle of the U-phase rectangular wave signal Pun such that the timing at which the switching element Qun corresponding to the lower arm is switched to the OFF state lags in comparison with that before the adjustment. At this time, the SW timing adjusting unit 1545 preferably adjusts the first switching angle of the U-phase rectangular wave signal Pun such that the first switching angle of the U-phase rectangular wave signal Pun lags by the shift amount corresponding to the difference between the inter-terminal voltage detection signal VH* and the target voltage value.

As illustrated in FIG. 16D, when the inter-terminal voltage detection signal VH* is greater than the target voltage value, the SW timing adjusting unit 1545 adjusts the second switching angle of the U-phase rectangular wave signal Pup and the first switching angle of the U-phase rectangular wave signal Pun so as to decrease the inter-terminal voltage detection signal VH* in comparison with that before the adjustment. In order to decrease the inter-terminal voltage detection signal VH*, the period in which the switching element Qup corresponding to the upper arm is in the ON state and the period in which the switching element Qun corresponding to the lower arm is in the OFF state can be extended.

Therefore, the SW timing adjusting unit 1545 adjusts the second switching angle of the U-phase rectangular wave signal Pup such that the second switching angle of the U-phase rectangular wave signal Pup leads in comparison with that before the adjustment. That is, the SW timing adjusting unit 1545 adjusts the second switching angle of the U-phase rectangular wave signal Pup such that the timing at which the switching element Qup corresponding to the upper arm is switched to the ON state leads in comparison with that before the adjustment. At this time, the SW timing adjusting unit 1545 preferably adjusts the second switching angle of the U-phase rectangular wave signal Pup such that the second switching angle of the U-phase rectangular wave signal Pup leads by the shift amount corresponding to the difference between the inter-terminal voltage detection signal VH* and the target voltage value.

Similarly, the SW timing adjusting unit 1545 adjusts the first switching angle of the U-phase rectangular wave signal Pun such that the first switching angle of the U-phase rectangular wave signal Pun leads in comparison with that before the adjustment. That is, the SW timing adjusting unit 1545 adjusts the first switching angle of the U-phase rectangular wave signal Pun such that the timing at which the switching element Qun corresponding to the lower arm is switched to the OFF state leads in comparison with that before the adjustment. At this time, the SW timing adjusting unit 1545 preferably adjusts the first switching angle of the U-phase rectangular wave signal Pun such that the first switching angle of the U-phase rectangular wave signal Pun leads by the shift amount corresponding to the difference between the inter-terminal voltage detection signal VH* and the target voltage value.

Referring to FIG. 13 again, the SW timing adjusting unit 1545 continuously performs the operation of adjusting the switching angles of the rectangular wave signals until the inter-terminal voltage detection signal VH* matches the target voltage value (step S423).

When it is determined as the result of the operation of adjusting the switching angles of the rectangular wave signals in the SW timing adjusting unit 1545 that the inter-terminal voltage detection signal VH* matches the target voltage value (YES in step S423), the V-phase correction value calculating unit 1546v calculates the average signal level of the V-phase current detection signal Iv* (step S424). Similarly, when it is determined as the result of the operation of adjusting the switching angles of the rectangular wave signals in the SW timing adjusting unit 1545 that the inter-terminal voltage detection signal VH* matches the target voltage value (YES in step S423), the W-phase correction value calculating unit 1546w calculates the average signal level of the W-phase current detection signal Iw* (step S424). Accordingly, the V-phase correction value calculating unit 1546v and the W-phase correction value calculating unit 1546w acquire the V-phase current detection signal Iv* and the W-phase current detection signal Iw*, respectively. At this time, the V-phase correction value calculating unit 1546v may acquire the V-phase current detection signal Iv* passing through the adder 158v. Alternatively, the V-phase correction value calculating unit 1546v may acquire the V-phase current detection signal Iv* not passing through the adder 158v. Similarly, the W-phase correction value calculating unit 1546w may acquire the W-phase current detection signal Iw* passing through the adder 158w. Alternatively, the W-phase correction value calculating unit 1546w may acquire the W-phase current detection signal Iw* not passing through the adder 158w.

At this time, the V-phase correction value calculating unit 1546v may calculate the average signal level of the V-phase current detection signal Iv* in a predetermined period. For example, the V-phase correction value calculating unit 1546v may calculate the average signal level of the V-phase current detection signal Iv* in the period corresponding to one cycle (or several cycles) of the V-phase current detection signal Iv*. Similarly, the W-phase correction value calculating unit 1546w may calculate the average signal level of the W-phase current detection signal Iw* in a predetermined period.

Thereafter, the V-phase correction value calculating unit 1546v calculates the V-phase correction value Cv4 based on the average signal level of the V-phase current detection signal Iv* calculated in step S424 (step S425). Specifically, as described above, it is estimated that the difference between the average signal level of the V-phase current detection signal Iv* (the average signal level of the V-phase current detection signal Iv* to which the V-phase correction value Cv4 is not added) and the zero level corresponds to an error $\alpha v$. Accordingly, the V-phase correction value calculating unit 1546v may calculate the V-phase correction value Cv4 such that the average signal level of the V-phase current detection signal Iv* is the zero level. At this time, the V-phase correction value calculating unit 1546v may calculate the V-phase correction value Cv4, for example, by performing PI control based on the average signal level of the V-phase current detection signal Iv*.

Similarly, the W-phase correction value calculating unit 1546w calculates the W-phase correction value Cw4 based on the average signal level of the W-phase current detection signal Iw* calculated in step S424 (step S425). Specifically, as described above, it is estimated that the difference between the average signal level of the W-phase current detection signal Iw* (the average signal level of the W-phase current detection signal Iw* to which the W-phase correction value Cw4 is not added) and the zero level corresponds to an error $\alpha w$. Accordingly, the W-phase correction value calculating unit 1546w may calculate the W-phase correction value Cw4 such that the average signal level of the W-phase current detection signal Iw* is the zero level. At this time, the W-phase correction value calculating unit 1546w may calculate the W-phase correction value Cw4, for example, by performing PI control based on the average signal level of the W-phase current detection signal Iw*.

Thereafter, the V-phase adder 158v adds the V-phase correction value Cv4 (see FIG. 12A), which has been calculated by the V-phase correction value calculating unit 1546v in step S425, to the V-phase current detection signal Iv* (step S426). Accordingly, as illustrated in FIG. 12B, the error $\alpha v$ included in the V-phase current detection signal Iv* is corrected.

Figure 17A:
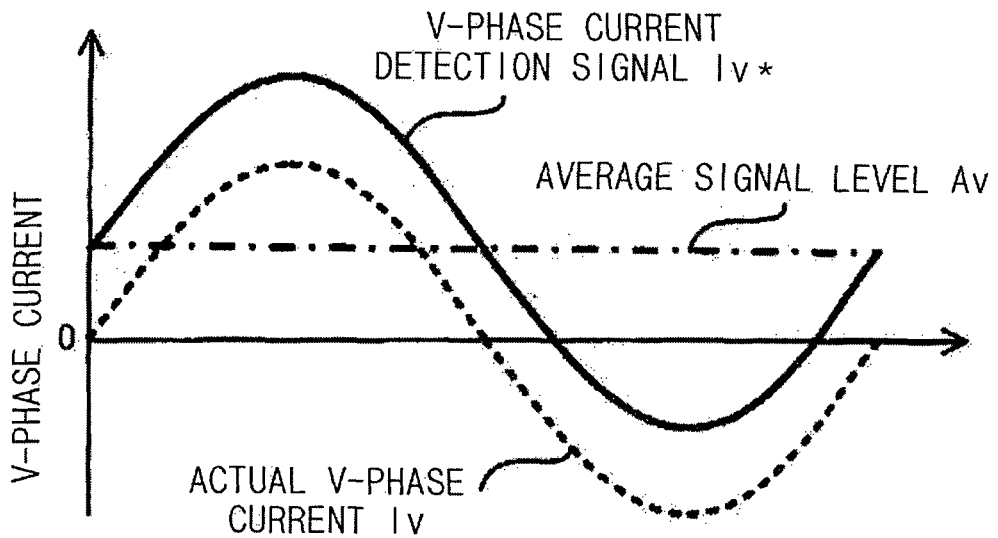
FIG. 17A is a graph illustrating a relationship between an average signal level of a V-phase current detection signal and a zero level.
Figure 17B:
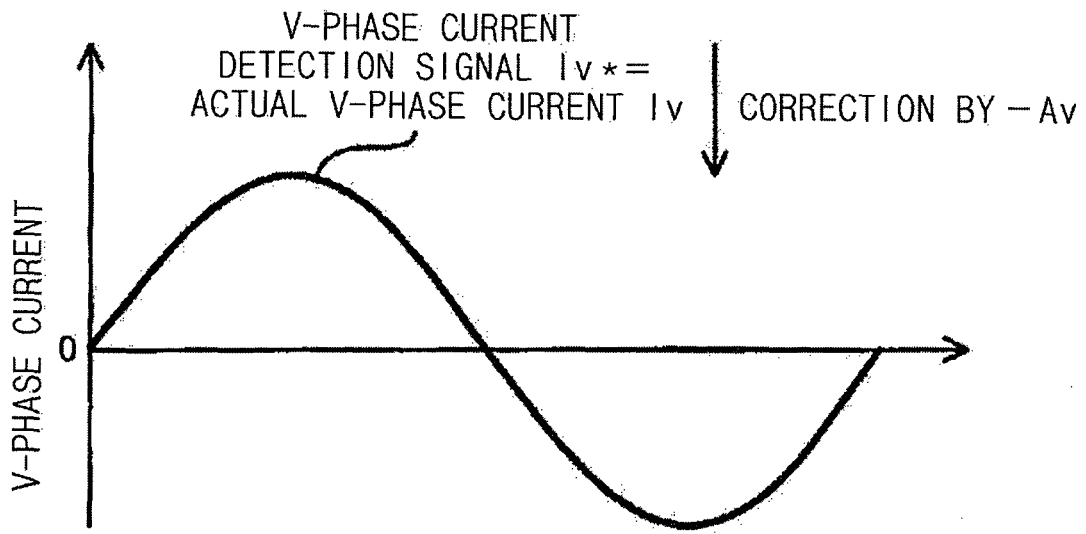
FIG. 17B is a graph illustrating a V-phase current detection signal to which a V-phase correction value calculated based on the average signal level of the V-phase current detection signal is added.

More specifically, a case in which the average signal level of the V-phase current detection signal Iv* to which the V-phase correction value Cv4 is not added is Av (where Av>0) is assumed as illustrated in FIG. 17A. In this case, the V-phase current detection signal Iv* can be said to indicate a current value greater by Av than the actual V-phase current. That is, the error $\alpha v$ of a magnitude which matches the average signal level Av can be said to be included in the V-phase current detection signal Iv*. Accordingly, in this case, the V-phase correction value Cv4 (which actually matches a value obtained by inverting the error $\alpha v$ or the sign of the average signal level Av to which the V-phase correction value Cv4 is not added) for causing the average signal level of the V-phase current detection signal Iv* to match the zero level is added to the V-phase current detection signal Iv*. As a result, as illustrated in FIG. 17B, the V-phase current detection signal Iv* matches the actual V-phase current Iv. That is, the error $\alpha v$ included in the V-phase current detection signal Iv* is corrected.

Thereafter, the W-phase adder 158w adds the W-phase correction value Cw4 (see FIG. 12A), which has been calculated by the W-phase correction value calculating unit 1546w in step S425, to the W-phase current detection signal Iw* (step S426). Accordingly, as illustrated in FIG. 12B, the error $\alpha w$ included in the W-phase current detection signal Iw* is corrected.

According to the above-mentioned rectangular wave control operation, the rectangular wave control unit 154 can suitably and individually correct the error $\alpha v$ and the error $\alpha w$, similarly to the PWM control unit 153. In addition, the rectangular wave control unit 154 can suitably correct the error $\alpha v$ and the error $\alpha w$ while the rectangular wave control unit 154 generates the rectangular wave signals or the like, similarly to the PWM control unit 153.

The rectangular wave control unit 154 can suitably correct the error $\alpha v$ and the error $\alpha w$ even when the inverter 13 is controlled in the rectangular wave control mode. Particularly, the rectangular wave control unit 154 can suitably correct the error $\alpha v$ and the error $\alpha w$ even when the inverter 13 is controlled in the rectangular wave control mode and the inter-terminal voltage VH varies due to a factor other than the error $\alpha v$ and the error $\alpha w$. That is, the rectangular wave control unit 154 can suitably correct the error $\alpha v$ and the error $\alpha w$ which cannot be corrected through the PWM control operation performed by the PWM control unit 153 because the inverter 13 is controlled in the rectangular wave control mode.

The PWM control unit 153 may correct the error $\alpha v$ and the error $\alpha w$ in the same mode as the rectangular wave control unit 154 corrects the error $\alpha v$ and the error $\alpha w$. Specifically, the PWM control unit 153 may adjust the inter-terminal voltage VH such that the inter-terminal voltage VH (inter-terminal voltage detection signal VH*) matches the target voltage value. Specifically, the PWM control unit 153 may adjust characteristics of the three-phase voltage command signals (or PWM signals) such that the inter-terminal voltage detection signal VH* matches the target voltage value. For example, the PWM control unit 153 may shift the three-phase voltage command signals to a high potential side or a low potential side such that the inter-terminal voltage detection signal VH* matches the target voltage value. For example, the PWM control unit 153 may adjust the phases of the three-phase voltage command signals such that the inter-terminal voltage detection signal VH* matches the target voltage value. Thereafter, the PWM control unit 153 may estimate that the difference between the average signal level of the V-phase current detection signal Iv* and the zero level corresponds to the error $\alpha v$ and then may calculate the V-phase correction value Cv3 corresponding to the difference. Similarly, the PWM control unit 153 may estimate that the difference between the average signal level of the W-phase current detection signal Iw* and the zero level corresponds to the error $\alpha w$ and then may calculate the W-phase correction value Cw3 corresponding to the difference.

In the above description, the PWM control unit 153 corrects the error $\alpha v$ and the error $\alpha w$ when the inverter 13 is controlled in the PWM control mode, and the rectangular wave control unit 154 corrects the error $\alpha v$ and the error $\alpha w$ when the inverter 13 is controlled in the rectangular wave control mode. However, even when the inverter 13 is controlled in a mode other than the PWM control mode and the rectangular wave control mode, at least one of the PWM control unit 153 and the rectangular wave control unit 154 may correct the error $\alpha v$ and the error $\alpha w$. For example, when the inverter 13 is controlled in an overmodulation PWM control mode, the PWM control unit 153 may correct the error $\alpha v$ and the error $\alpha w$.

In the above description, the rectangular wave control unit 154 calculates the V-phase correction value Cv4 such that the average signal level of the V-phase current detection signal Iv* matches the zero level (or the reference signal level). However, the rectangular wave control unit 154 may calculate the V-phase correction value Cv4 such that the V-phase current detection signal Iv* itself matches a desired value. Alternatively, the rectangular wave control unit 154 may calculate the V-phase correction value Cv4 such that an arbitrary parameter indicating a characteristic of the V-phase current detection signal Iv* matches a desired value. The same is true when the W-phase correction value Cw4 is calculated.

In the above description, the vehicle 1 includes two current sensors (that is, the V-phase current sensor 14v and the W-phase current sensor 14w). However, the vehicle 1 may include one current sensor or three or more current sensors. For example, the vehicle 1 may include at least one current sensor that detects at least one of the U-phase current Iu, the V-phase current Iv, and the W-phase current Iw. In this case, the ECU 15 only has to include the correction value calculating unit 1536, the correction value calculating unit 1546, and the adder 158 which correspond to the phase in which the current sensor is installed.

The invention is not limited to the above-mentioned embodiments but can be appropriately changed without departing from the gist or idea of the invention which is read from the appended claims and the entire specification. A controller for an electric motor system including such a change is included in the technical scope of the invention.

What is claimed is:

1. A controller for an electric motor system, the electric motor system including a DC power supply, a power converter, a smoothing capacitor, a three-phase AC motor, and a current sensor, the power converter being configured to convert DC power supplied from the DC power supply into AC power output, the smoothing capacitor being electrically connected in parallel to the power converter, the three-phase AC motor being driven by the AC power output from the power converter, the current sensor being configured to detect a phase current supplied to the three-phase AC motor and output a detection value indicating a value of the phase current or a characteristic of the phase current, the controller comprising:

an electronic control unit configured to control the power converter such that an inter-terminal voltage of the smoothing capacitor matches a first reference value, the first reference value being a value which is determined as the inter-terminal voltage of the smoothing capacitor when the phase current is equal to a second reference value, the inner-terminal voltage being adjusted while the electronic motor system is driven, wherein the electronic control unit is configured to correct the detection value such that a difference between the detection value and the second reference value is decreased, when the inter-terminal voltage matches the first reference value and the detection value does not match the second reference value, wherein the power converter includes a switching element corresponding to an upper arm and a switching element corresponding to a lower arm for each phase, the electronic control unit is configured to cause a first switching timing to lead when the inter-terminal voltage is less than the first reference value, the first switching timing being a timing at which the switching element corresponding to the upper arm of the target phase switches from an ON state to an OFF state, and the electronic control unit is configured to cause the first switching timing to lag when the inter-terminal voltage is greater than the first reference value.

2. The controller according to claim 1, wherein the electronic control unit is configured to specify a target phase which is a phase in which a phase current for mainly defining a capacitor current flowing through the smoothing capacitor flows, and the electronic control unit is configured to control the phase current having the target phase of the power converter such that the inter-terminal voltage matches the first reference value.

3. The controller according to claim 2, wherein the power converter includes switching elements corresponding to phases of the three-phase AC motor respectively, and the electronic control unit is configured to control a switching timing of one of the switching elements corresponding to the target phase such that the inter-terminal voltage matches the first reference value.

4. The controller according to claim 3, wherein the power converter includes a switching element corresponding to an upper arm and a switching element corresponding to a lower arm for each phase, the electronic control unit is configured to cause a second switching timing to lag when the inter-terminal voltage is less than the first reference value, the second switching timing being a timing at which the switching element corresponding to the upper arm of the target phase switches from an OFF state to an ON state, and the electronic control unit is configured to cause the second switching timing to lead when the inter-terminal voltage is greater than the first reference value.

5. The controller according to claim 1, wherein the electronic control unit is configured to correct the detection value such that the detection value matches the second reference value, when the inter-terminal voltage matches the first reference value and the detection value indicating the value of the phase current does not match the second reference value.

6. The controller according to claim 1, wherein the electronic control unit is configured to correct the detection value such that a difference between the detection value and the second reference value is decreased, when the inter-terminal voltage matches the first reference value and the detection value indicating an average value of the phase current does not match the second reference value.

7. The controller according to claim 1, wherein the electronic control unit is configured to specify a target phase which is a phase in which a phase current for mainly defining a capacitor current flowing through the smoothing capacitor flows, and the electronic control unit is configured to correct the detection value such that a difference between the detection value and the second reference value is decreased, when the power converter operates in a first operation mode based on a rectangular wave control mode, the inter-terminal voltage matches the first reference value, and the detection value does not match the second reference value, and the electronic control unit is configured to correct the detection value of the phase current having the target phase such that the inter-terminal voltage matches the first reference value, when the power converter operates in a second operation mode based on a pulse width modulation control mode.

\* \* \* \* \*